(12) United States Patent
Smith et al.

(10) Patent No.: US 8,277,882 B2
(45) Date of Patent: *Oct. 2, 2012

(54) ROOFING AND/OR SIDING MATERIAL AND A METHOD OF FORMING THEREOF

(75) Inventors: Jason Smith, Strongsville, OH (US); Fred Fensel, Shaker Heights, OH (US); Brian Lambert, Strongsville, OH (US)

(73) Assignee: Garland Industries, Inc., Cleveland, OH (US)

( * ) Notice: Subject to any disclaimer, the term of this patent is extended or adjusted under 35 U.S.C. 154(b) by 772 days.

This patent is subject to a terminal disclaimer.

(21) Appl. No.: 12/340,062

(22) Filed: Dec. 19, 2008

(65) Prior Publication Data

US 2009/0317593 A1 Dec. 24, 2009

Related U.S. Application Data

(60) Continuation-in-part of application No. 11/651,976, filed on Jan. 10, 2007, which is a division of application No. 10/951,973, filed on Sep. 29, 2004, now Pat. No. 7,291,358.

(51) Int. Cl.
*B05D 1/12* (2006.01)
*B05D 5/06* (2006.01)

(52) U.S. Cl. .................... 427/186; 427/188

(58) Field of Classification Search ........... 427/186, 427/188
See application file for complete search history.

(56) References Cited

U.S. PATENT DOCUMENTS

| | | | |
|---|---|---|---|
| 1,913,667 A | 6/1933 | Harshberger |
| 2,131,043 A | 6/1933 | Harshberger |
| 2,133,988 A | 10/1935 | Harshberger |
| 3,131,044 A | 9/1938 | Harshberger |
| 2,202,002 A | 5/1940 | Harshberger |
| 2,332,219 A | 10/1943 | Harshberger |
| 2,379,358 A | 6/1945 | Jewett |
| 3,255,031 A | 6/1966 | Lodge |
| 3,479,201 A | 11/1969 | Sloan |
| 3,528,842 A | 9/1970 | Skadulis |
| 3,856,545 A | 12/1974 | Ferrigno |
| 4,120,132 A | 10/1978 | Kendrick |
| 4,288,959 A | 9/1981 | Murdock |
| 4,478,869 A | 10/1984 | Brady |
| 4,617,198 A | 10/1986 | Overturf |
| 5,088,259 A | 2/1992 | Myers |
| 5,132,164 A | 7/1992 | Moriya et al. |
| 5,382,552 A | 1/1995 | Saad |
| 5,456,785 A | 10/1995 | Venable |
| 5,474,838 A | 12/1995 | Callaway |
| 5,540,971 A | 7/1996 | Daurer |
| 5,573,810 A | 11/1996 | Grubka |

(Continued)

OTHER PUBLICATIONS

Data Sheet entitled *Tabular Alumina*; T-1064 (www.ceminerals.com) Copyright Imerys.

(Continued)

*Primary Examiner* — Frederick Parker

(74) *Attorney, Agent, or Firm* — Fay Sharpe LLP; Brian E. Turung

(57) ABSTRACT

A roofing and/or siding system having an improved average resulting reflectivity. The roofing and/or siding system is at least partially coated with a plurality of granules. At least one layer of paint is applied to the roofing and/or siding system to increase the resulting reflectivity of the roofing and/or siding system.

24 Claims, 6 Drawing Sheets

U.S. PATENT DOCUMENTS

| | | |
|---|---|---|
| 5,620,554 A | 4/1997 | Venable |
| 5,643,399 A | 7/1997 | Venable |
| 5,695,373 A | 12/1997 | Blackmore et al. |
| 5,813,176 A | 9/1998 | Tzeng |
| 5,965,626 A | 10/1999 | Tzeng |
| 6,110,846 A | 8/2000 | Brzozowski |
| 6,194,519 B1 | 2/2001 | Blalock |
| 6,207,593 B1 | 3/2001 | Fields |
| 6,235,372 B1 | 5/2001 | Joedicke |
| 6,295,912 B1 | 10/2001 | Burleson |
| 6,296,912 B1 | 10/2001 | Zickell |
| 6,296,921 B1 | 10/2001 | Blackmore |
| 6,341,462 B2 | 1/2002 | Kiik |
| 6,360,511 B1 | 3/2002 | Brzozowski |
| 6,502,360 B2 | 1/2003 | Carr, III et al. |
| 6,548,145 B2 | 4/2003 | Joedicke |
| 6,607,781 B2 | 8/2003 | Joedicke |
| 6,872,440 B1 * | 3/2005 | Kiik et al. .................. 428/141 |
| 6,933,007 B2 * | 8/2005 | Fensel et al. ................ 427/186 |
| 7,070,844 B2 | 7/2006 | Bartek et al. |
| 2002/0066233 A1 | 6/2002 | McArdle |
| 2003/0152742 A1 | 8/2003 | Shimizu |
| 2004/0071938 A1 | 4/2004 | Fensel |
| 2005/0139126 A1 | 6/2005 | Khan et al. |
| 2005/0145139 A1 | 7/2005 | Khan et al. |
| 2005/0250399 A1 | 11/2005 | Kuhn |
| 2005/0257875 A1 | 11/2005 | Khan et al. |
| 2005/0261407 A1 | 11/2005 | Khan et al. |
| 2005/0261409 A1 | 11/2005 | Khan et al. |
| 2006/0240224 A1 | 10/2006 | Khan et al. |
| 2007/0054129 A1 | 3/2007 | Kalkanoglu |

OTHER PUBLICATIONS

Technology and material design in PVDF protected thermoplastic substrates, David Silary; Journal of Fluorine Chemistry 104 (2000) 79-86.

* cited by examiner

ROOFING AND/OR SIDING MATERIAL AND A METHOD OF FORMING THEREOF

The present invention is a continuation-in-part of U.S. application Ser. No. 11/651,976 filed Jan. 10, 2007, which in turn is a divisional of U.S. application Ser. No. 10/951,973 filed Sep. 29, 2004, now issued as U.S. Pat. No. 7,291,358, all of which are incorporated herein by reference.

The present invention relates to roofing and/or siding materials, and more particularly to improved roofing and/or siding materials having increased reflectivity.

INCORPORATION BY REFERENCE

U.S. Pat. Nos. 2,379,358; 3,255,031; 3,479,201; 3,528,842; 4,120.132; 4,288,959; 4,478,869; 5,088,259; 5,474,838; 5,540,971; 5,573,810; 5,695,373; 5,813,176; 5,965,626; 6,110,846; 6,194,519; 6,207,593; 6,296,912; 6,296,921; 6,341,462; and 6,360,511; and United States Patent Publication No. 2004/0071938 published on Apr. 15, 2004 are incorporated herein by reference to illustrate various types of roofing and/or siding systems on which the granular material of the present invention can be used, to also illustrate various manufacturing techniques for making such roofing and/or siding systems, and/or to further illustrate various types of prior art granules.

BACKGROUND OF THE INVENTION

Weather resistant granules of various hues, embedded on the surface of various types of roofing and/or siding, have been used extensively to provide an aesthetically pleasing color to such surfaces. In North America, asphalt-based roofing materials are a popular medium for covering roofs of homes and other structures. Asphalt-based roofing materials typically come in shingle or roll form, the shingle being the more widely used material. A typical asphalt shingle has an asphalt substrate and a multitude of granules placed thereon. The granules are generally embedded in the asphalt coating on the surface of an asphalt-impregnated base material such as roofing felt. The granules, which are embedded in one surface of the asphalt-impregnated and/or asphalt-coated fiber sheet material, form a coating to provide an inherently weather-resistant, fire-resistant, and/or decorative exterior surface. Because the granule coating provides the aesthetic effect observable with respect to the roofing material, the appearance of the granules is of major marketing importance. For this reason, a pigmented color coating is ordinarily applied to the granules to enhance their visual decorative effect.

The granules employed for roofing and siding are generally derived from a hard mineral base rock such as slate, basalt or nephelite. The granules are typically ground to a particle size of about 10 to about 35 US mesh. These granules, which comprise a base substrate, are then coated with a pigment composition having a thickness of about 4 to about 18 microns. Colored roofing granules are typically prepared by heating mineral rock granules of about 12-40 US mesh up to approximately 1000° F. A paint slurry containing a pigment is then applied to the heated granules in a mixer. Kaolin clay is used extensively in silicate paint formulations for coloring roofing granules. It serves as a filler, extender, moisture release agent, and reactant to aid film insolubilization during high temperature firing. Although kaolin clay is a major component of such coating formulations, it alone lacks the brightness and opacity needed to hide the dark underlying base rock of the granule. Light colored roofing granule coatings using natural kaolin clay frequently require appreciable amounts of $TiO_2$ to achieve desired color specifications. Light colored roofs are particularly favored in many areas. The $TiO_2$ is commonly used in conventional insolubilized alkali silicate coatings, such as those described in U.S. Pat. Nos. 2,379,358; 3,255,031; and 3,479,201, which are incorporated herein by reference. Other types of coating compositions have been used. For example, U.S. Pat. No. 3,528,842, which is incorporated herein by reference, discloses artificially colored roofing granules. These granules consist primarily of crushed and screened minerals, in which the granules are coated with a suitable pigment contained in an inorganic matrix or bond. Some common pigments include red iron oxide, yellow iron oxide, titanium dioxide, chrome hydrate, chrome oxide, chrome green, ultramarine blue, phthalocyanine blue and green, carbon black, metal ferrites, and mixtures thereof. The bond is usually applied in the form of a soluble silicate solution and is insolubilized either by heat treatment or by a combination of heat treatment and chemical action. Minnesota Mining and Manufacturing Company ("3M") has offered pigmented roofing granules known under the trade designations "LR-7000," "LR-7070," 3M Brand "4100," and 3M Brand "9300." These granules include multiple silicate-clay coatings which may include cuprous oxide or zinc oxide. Other types of pigment compositions include an aqueous slurry of an iron oxide pigment and a mixture of a silicate and clay.

Although the color of a particular roofing system plays an important role in determining which roofing system will be purchased by consumers, other factors are also of importance in determining the color of a particular roofing system. One such factor is the energy efficiency of the roofing system. Several cities and states are beginning to consider legislation or currently require some roofing structures to have a certain resulting reflectivity. This is of particular importance in temperate regions, such as in the Southern and Southwest regions of the United States. For instance, California is planning to require in 2005 "cool roof" systems to have a resulting reflectively of at least 70% and an emmissivity of at least 0.9. Lighter colored roofs are known to reduce the roof temperature, thereby reducing the cooling costs of the roofed structure. For instance, on a 90° F. sunny day, the roof temperature of a light colored granular coated roof can be about 20-30° F. cooler than an aluminum roof system and about 70-80° F. cooler than a black asphalt roof. As a result, the lighter colored roof system can amount to an energy savings of about 5-10%. The cooler temperature of the light colored roof system not only reduces the cooling costs associated with the building, but the heat generated by the light colored roof contributes less heat to the surrounding environment, thus improving air quality, especially in urban areas.

Typical light colored roofing systems have light colored granules having a reflectivity of up to 30% and a resulting roofing reflectivity of up to 27%. Darker colored granules typically have a lower reflectivity and a resulting roofing reflectivity that is less than roofing systems having lighter colored granules. The Garland Company has recently developed a highly reflective granular roof system that has a resulting reflectivity of at least 45%. This granular roofing system is disclosed in United States Patent Publication No. 20040071938 published on Apr. 15, 2004. Although this granular roof system constituted a significant advance in the roofing, the achievable resulting reflectively on granular roofing systems form on a bitumen layer was limited to less than 70%. The bitumen layer on the roofing system is a generally black color, thus has a low reflectivity. When coating the bitumen layer with reflective particles, some of the bitumen surface remains exposed, thus reducing the resulting reflectivity of the roofing system.

One practice for obtaining a highly reflective surface on a roofing system is to apply a thick coating of highly reflective white paint to the surface of the installed roofing system. Typically a wet paint coating thickness of about 32 mils or more was applied after the roofing system is installed on a structure. Although the application of a highly reflective paint layer on the existing roof system achieved a resulting reflectivity of 70% or greater, the application of the paint on the roof system was expensive due to the large volume of paint needed to obtain the needed paint coating thickness to achieve the desired resulting reflectivity, and from the labor and materials required to apply the paint to the surface of the roofing system. Furthermore, the application of a paint coating on an existing roof system can be problematic due to the problems associated with paint spray during application of the paint and/or the added weight to the roof system due to the application of the thick paint layer.

In view of the continued demand for greater energy savings, there is a demand for a prefabricated roofing system having increased reflectivity.

SUMMARY OF THE INVENTION

The present invention relates to roofing and/or siding materials and a method of making such materials having improved reflectivity, and more particularly to roofing and/or siding material having a resulting or effective reflectivity of at least about 60%. The present invention is applicable to many types of roofing and/or siding materials including, but not limited to, shingles, cap sheet roll roofing, modified bitumen, metal roofing and/or siding, plastic roofing and/or siding, and wood roofing and/or siding. The present invention is particularly applicable to prefabricated roofing systems such as, but not limited to, shingles, cap sheet roll roofing, modified bitumen, metal roofing and/or siding, plastic roofing and/or siding, and wood roofing and/or siding wherein the roofing materials are manufactured off-site and then subsequently installed on a roof and/or siding of a building or other type of structure.

Roofing systems having a bitumen- or asphalt-based water-resistant layer are well-known. Due to their chemical composition, these water-resistant layers are highly absorptive of radiation. In fact, these roofing layers may be regarded in an uncoated state as black-body absorbers; that is, they effectively absorb almost all of the radiation that impinges upon them. Such asphalt surfaces absorb radiation, thereby resulting in increased temperature which can result in thermal degradation of the roofing system and/or increase the cooling costs of the roofed structure. In warmer regions or more temperate regions, the bitumen- or asphalt-based layer can be heated to temperatures that significantly soften the bitumen- or asphalt-based water-resistant layer, thereby exposing the softened layer to damage by foot traffic, as well as damage to an individual's shoes. As a result of these undesirable consequences of bitumen- or asphalt-based roofing coatings, a layer of solid material such as, but not limited to, granules is typically applied to the surface of the bitumen- or asphalt-based layer. The solid material has been found to increase the life of the bitumen- or asphalt-based layer, and in some cases, reduce the temperature of the roof surface when exposed to the sunlight. The solid material is also used to alter the appearance of the roof surface, provide weather protection to the roof surface, improve the fire rating of the roofing surface, reduce photo degradation of the roofing surface, improve impact resistance of the roofing surface (e.g., hail damage, foot traffic), improve slip resistance of the roofing surface, and/or provide an anti-blocking effect when the roofing material is rolled after manufacture. As a result, it is now common to embed a layer of roofing granules and/or another type of solid material in an exposed surface of such a roofing system, whether that systems is discrete membrane panels such as shingles, rolled membrane products (e.g., modified bitumen, cap sheet roll roofing), or formed in place membranes, such as are formed by mopping liquid bitumen- or asphalt based roofing material atop a roofing base.

Roofing and/or siding shingles and cap sheet roll roofing and/or siding usually employ a web of fibrous base material. The base material typically is a nonwoven fabric such as, but not limited to, felt (organic, glass fiber, polyester, polypropylene, etc.), fiberglass, or similar materials, which are commonly coated with a material. One non-limiting material is a bituminous composition such as, but not limited to, bitumens, modified bitumens, tars, pitches, asphalt, and the like. As can be appreciated, other types of coatings (e.g., polymers, etc.) can be use as an alternative coating or in conjunction with a bituminous composition. The bituminous composition can include a filler such as, but not limited to, inorganic fillers or mineral stabilizers, organic materials such as polymers, recycled streams, or ground tire rubber, slate flour and/or powdered limestone. A solid material such as, but not limited to, granules are then pressed into the layer of bituminous composition while it is in a warm, softened condition. Typically a majority of the solid material is applied to the bituminous composition so that at least a portion of the solid material extends above the bituminous composition layer. Upon cooling, the solid material remains attached as a surface layer of bituminous composition. Finely divided materials such as, but not limited to, mica flakes, talc, silica dust or the like can be applied and/or made adherent to the non-weather exposed surface of the shingle to prevent sticking of the adjacent layers of the material when placed in packages or shipment or storage. Non-limiting examples of shingles are disclosed in U.S. Pat. Nos. 6,194,519; 6,296,912; and 6,341,462, which are incorporated herein by reference. These shingles or a modified version of these shingles can be formed by the manufacturing process of the present invention to form highly reflective shingles. The process of the present invention can be used to form such shingles off-site at a manufacturing facility and then have such shingles delivered to a construction-site for installation of a building or other type of structure.

Modified bitumen materials incorporate the use of a composite fabric that is at least partially impregnated with a bituminous composition. The composite fabric typically includes, but is not limited to, a layer of woven or nonwoven material connected to one or more layers of low shrinkage warp strands and/or one or more layers of low shrinkage weft strands. The layers are typically at least partially stitched together, at least partially knitted together, at least partially melted together and/or otherwise bound together to maintain the integrity of the fabric. The resultant fabric may be coated with a resin or sizing to prevent slippage between the several layers of the fabric and impart a measure of stiffness to the fabric; however, this is not required. The fibers comprising the warp stands, the weft strands, and/or the woven or nonwoven material can include fibers selected from a variety of sources such as, but not limited to, natural materials, polymeric materials, inorganic materials or combinations thereof. Non-limiting examples of such fibers include polycrystalline fibers, fiberglass, thermoplastic fiber filaments (e.g., polyamide fibers of poly (p-phenylene terephthalate), poly (o-phenylene terephthalamide), ultra low shrink polyester), cotton, cellulose, natural rubber, flax, ramie, hemp, sisal, wool, linen (flax), paper, wood pulp, polyamides, polyesters, acrylics, polyolefins, polyurethanes, vinyl polymers, and derivatives, or mixtures thereof. The fibers can be continuous filaments, fibers, strands and/or yarn; however, this is not required. Similar to shingles, the composite fabric is coated with coating material such as, but not limited to a bituminous material and then commonly coated with a solid material such as, but not limited to, granules that are then at least partially pressed into the layer of bituminous material while it is in a warm, softened condition. Typically a majority of the solid material is applied to the bituminous composition so that at least a portion of the solid material extends above the bituminous composition layer. Non-limiting examples of modified bitumen materials are disclosed in U.S. Pat. Nos. 5,474,838; 5,540,971; 5,695,373; 6,296,921, which are incorporated herein by reference. These modified bitumen materials or a modified version of these materials can be formed by the manufacturing process of the present invention to form a highly reflective modified bitumen materials. The process of the present invention can be used to form such materials off-site at a manufacturing facility and then have such materials delivered to a construction-site for installation of a building or other type of structure.

Metal, plastic and wood roofing and/or siding have also been coated with solid material such as, but not limited to, granules to provide texture, color and/or improved durability. Typically, the solid material is adhered to the metal, plastic and/or wood roofing and/or siding by the use of an adhesive such as, but not limited to, polymer adhesives, glue, bitumen, asphalt, etc. Non limiting examples of metal, plastic and/or wood roofing and/or siding are disclosed in U.S. Pat. Nos. 4,120,132 and 4,288,959, which are incorporated herein by reference. These metal, plastic and/or wood roofing and/or siding systems or a modified version thereof can incorporate the forming process of the present invention to form a highly reflective metal, plastic and/or wood roofing and/or siding system.

The present invention is particularly directed to a roofing and/or siding system that has a resulting reflectivity of at least about 60%, and more particularly at least about 70% and will be particularly described with reference thereto. The improved reflectivity of the roofing and/or siding system provides several benefits to the roofing and/or siding system. The increased resulting reflectivity of the roofing and/or siding system reduces the temperature of the surface of the roofing and/or siding system, especially on warm, sunny days. The reduced surface temperature of the roofing and/or siding system reduces the amount of heat transfer from the surface of the roofing and/or siding system to the structure positioned adjacently the roofing and/or siding system. As a result, less energy is required to maintain the structure adjacent to the roofing and/or siding system at a cooler temperature. The reduced surface temperature of the roofing and/or siding system also reduces the contribution of the roofing and/or siding system as an urban heat island, which can have negative effect on air quality in urban areas. As a result, the improved roofing and/or siding system is more environmentally friendly. The increased reflectivity of the roofing and/or siding system also increases the life of the roofing and/or siding system. Increased roof temperatures result in the increased rate of degradation to the materials that make of the roofing and/or siding system (e.g., bitumen, asphalt, woven materials, non-woven materials, adhesives, etc.). In addition to the adverse of effects of high temperatures, sunlight, especially UV light, can increase the rate of degradation of the materials that make up the roofing and/or siding system. The improved reflectivity of the roofing and/or siding system of the present invention increases the life of the roofing and/or siding system by reducing the surface temperature of the roofing and/or siding system, thus reducing the rate of thermal degradation. The improved reflectivity of the roofing and/or siding system of the present invention also increases the life of the roofing and/or siding system by reducing the amount of sunlight that penetrates into the surface of the roofing and/or siding system. The improved reflectivity of the roofing and/or siding system of the present invention also enables the roofing system to be classified as a "cool roof." Such a roofing classification provides many advantages for buildings such as, but not limited to, taxes incentives, relaxation of various envelope criteria of a building with respect to energy classifications, etc. In one embodiment of the present invention, the average resulting reflectivity of the roofing and/or siding system is at least about 60%. In one aspect of this embodiment, the average resulting reflectivity of the roofing and/or siding system is at least about 65%. In another and/or alternative aspect of this embodiment, the average resulting reflectivity of the roofing and/or siding system is at least about 70%. In still another and/or alternative aspect of this embodiment, the average resulting reflectivity of the roofing and/or siding system is about 70-99.9%. In yet another and/or alternative aspect of this embodiment of the invention, the average resulting reflectivity of the roofing and/or siding system that includes a bitumen material is at least about 60%. In one non-limiting example of this aspect, a roofing and/or siding shingles and cap sheet roll roofing and/or siding usually employ a web of fibrous base material that includes a bitumen material has an average resulting reflectivity of about 65-85%. In another non-limiting example of this aspect, a modified bitumen material has an average resulting reflectivity of about 65-85%.

In one aspect of the present invention, the solid material that is applied to the various roofing systems of the present invention is typically a light colored material such as, but not limited to a white colored solid material. One non-limiting light colored solid material is white colored granules which can be applied to roofing and/or siding systems. Commonly used white colored granules have a reflectivity of about 28-30%, which results in prior art roof and/or siding systems having an effective or resulting reflectivity of less than 28%. Granules having a color other than white generally had a reflectivity of less than about 28-30%, thereby resulting in prior art roof and/or siding systems having an even lower effective or resulting reflectivity. A new class of highly reflective granular material was disclosed in United States Patent Publication No. 2004/0071938 published on Apr. 15, 2004, which is incorporated herein by reference. This highly reflective granular material and/or similar materials can be used on the roofing and/or siding systems of the present invention to enhance the resulting or effective reflectivity of the roofing or siding system. The solid material that is applied to the roofing and/or siding system can be the same type of solid material, or can be a mixture of different types, textures, shapes, and/or colors of solid material. As set forth above, the solid material can include a) common granular material the same as and/or similar to, but not limited to, the granules identified in the prior art above, b) granular material the same as or similar to the granular material disclosed in United States Patent Publication No. 2004/0071938, and/or c) other solid material such as, but not limited to, broken or crushed glass, graphite, polymer material (e.g., polymer balls, plastic beads, etc.), sand, metal (e.g., metal flakes, metal balls, etc.). In another and/or alternative embodiment of the present invention, the average reflectiveness of the solid material used on the roofing and/or siding is at least about 35%. As can be appreciated, sold material having an average reflectivity of less than 35% can be used. In one aspect of this embodiment, the average reflectiveness of the solid material is about 35-99%. In another and/or alternative aspect of this embodiment, the average reflectivity of the solid material is about 40-99%. In still another and/or alternative aspect of this embodiment, the average reflectivity of the solid material is about 50-99%. In yet another and/or alternative aspect of this embodiment, the average reflectivity of the solid material is about 60-99%. In still yet another and/or alternative aspect of this embodiment, the average reflectivity of the solid material is about 65-99%. In still another and/or alternative embodiment of the present invention, a majority of the solid material is a light colored material. In one aspect of this embodiment, a majority of the solid material is a single color. In another and/or alternative aspect of this embodiment, a majority of the solid material is white colored.

In another and/or alternative aspect of the present invention, the solid material applied to the roofing and/or siding system is a durable material that facilitates in increasing the life of the roofing and/or siding system. In one embodiment of the invention, the solid material applied to the roofing and/or siding system has an average hardness of over about 3 Moh's hardness. As can be appreciated, a solid material having a Moh's hardness of 3 or less can be used. The hardness of the solid material granules can affect the durability of the roofing and/or siding system. An increased hardness of the solid material can extend the life of the roofing and/or siding material. In one aspect of this embodiment, the average hardness of the solid material is about 3.5-10 Moh's hardness. In another and/or alternative aspect of this embodiment, the average hardness of the solid material is about 4-10 Moh's hardness. In another and/or alternative embodiment of the invention, the average porosity of the solid material is low; however, this is not required. Solid material that is highly porous can be susceptible to several problems (e.g., absorption of water, oils and/or dirt; discoloration, fracturing, etc.). In still another and/or alternative embodiment of the invention, the opacity of the solid material is typically selected to be sufficiently high to limit the amount of light passing through the granules; however, this is not required. Certain types of light are known to cause accelerated degradation of the bitumen and/or asphalt of a roofing and/or siding system. The solid material can be the same opacity, or can be a mixture of different opacities. In one aspect of this embodiment, the average opacity of the solid material is over about 50%. In another aspect of this embodiment, the average opacity of the solid material is at least about 70%.

In yet another and/or alternative aspect of the present invention, the roofing and/or siding system is coated by a multiple solid material coating method. The industry standard for granules coated on shingles, modified bitumen, and/or cap sheet roll roofing is typically No. 11 grade granules (typically 8×40 US mesh having an average particle size of about 19 US mesh (i.e., 937 mm sieve designation)). This size of granules typically coats about 95-98% of the surface of the asphalt or bitumen layer of the roofing material. As a result, some of the asphalt or bitumen layer remains exposed, even when two coating layers of granules are used and/or the non-adhered granules are reapplied to the surface of the granular coated roofing material. Since the exposed surface is the black bitumen, the black exposed surface acts as a black body and absorbs light, thus significantly reducing the resulting or effective reflectivity of the roofing material. The present invention typically utilizes the improved process and method of coating shingles, modified bitumen, and/or cap sheet roll roofing as disclosed in United States Patent Publication No. 20040071938; however, this is not required. It can be appreciated that this improved coating process can be used on other types of roofing and/or siding systems. The improved process and method of coating the surface of various types of roofing and/or siding systems includes the steps of applying a solid material having a first average particle size, and subsequently applying another layer of solid material having a second average particle size, wherein the first average particle size is greater than the second average particle size. The use of at least two different sizes of solid material has been found that significantly improved coverage by the solid material on the asphalt or bitumen layer of the roofing and/or siding material. As such, the amount of exposed asphalt or bitumen is reduced, thereby increasing the resulting and/or effective reflectivity of the roofing and/or siding system. Use of multiple sized particles of solid material can increase the average reflectivity of the roofing and/or siding system by about 1-10% or more. As can be appreciated, more than two coating layers can be applied to the asphalt or bitumen layer of the roofing material. However, if more than two layers are applied, the last coating layer typically includes the smaller-sized granules. The multiple solid material particle size coating process can be also used on other types of roofing and/or siding systems wherein an adhesive is typically used to secure the solid material the roofing material (e.g., metal roofing, plastic roofing, wood roofing). When multiple coating procedures are used to apply the sold material on the roofing and/or siding material, generally the solid material is applied and/or spread onto the roofing and/or siding system until at least about 75% of the top surface is covered by the solid material. For shingles, cap sheet roll roofing and modified bitumen roof systems, the coverage of the first layer of solid material is typically at least about 80%, and typically at least about 90%. As can be appreciated, other coating percentages can be used. After the last coating of solid material is applied to the roofing and/or siding system, the top coverage of the solid material is generally at least about 90%. For shingles, cap sheet roll roofing and modified bitumen roof systems, the combined coverage of all the layers of solid material is typically at least about 95%, and typically at least about 98%. As can be appreciated, other coating percentages can be used. In one embodiment of the invention, a first layer of solid material having a first average particle size is applied to a roofing and/or siding system. After the first layer of solid material is applied to the roofing and/or siding system, the solid material can be at least partially pressed onto the surface of the roofing and/or siding material to enhance the adhesion of the solid material to the roofing and/or siding system; however, this is not required. In addition, after the first layer of solid material is applied to the roofing and/or siding system, the loose solid material can be removed from the surface of the roofing and/or siding material so as to enable subsequent coatings of solid material to adhere to the surface of the roofing and/or siding system; however, this is not required. In another embodiment of the invention, a layer of solid material having a first average particle size is applied to a roofing and/or siding system. This layer of solid material includes at least two distinct particle sizes of solid material. After this layer of solid material is applied to the roofing and/or siding system, the solid material can be at least partially pressed onto the surface of the roofing and/or siding material to enhance the adhesion of the solid material to the roofing and/or siding system; however, this is not required. In still another and/or alternative embodiment of the invention, at least one coating layer is formed by a solid material having an average particle size of larger than about 30 US mesh, and at least one other coating layer of solid material has an average particle size of less than about 30 US mesh. As can be appreciated, different size ranges of granules can be used on different types of roofing and/or siding systems. As a result, the average particle size of the granules will typically depend on the type of roofing and/or siding system, and/or the desired end use of the roofing and/or siding system. In one aspect of this embodiment, at least one coating layer is formed by a solid material having an average particle size of larger that about 25 US mesh, and at least one other coating layer is formed by a solid material having an average particle size of less than about 25 US mesh. In another and/or alternative aspect of this embodiment, the ratio of the average particle size of at least one layer of solid material to the average particle size of at least one other layer of solid material is at least about 1.3:1. In another and/or alternative aspect of this embodiment, the ratio of the average particle size of at least one layer of solid material to the average particle size of at least one other layer of solid material is about 1.5-50:1.

In still yet another and/or alternative aspect of the present invention, the roofing and/or siding system is coated with at least one layer of a highly reflective paint. The application of one or more layers of paint on the roofing and/or siding system can significantly increase the reflectivity of the roofing and/or siding system. The one or more layers of paint can be a solvent-based paint, a latex-based paint, acrylic-based paint, polyurethane base paint, Polyvinylidene Fluoride (PVDF) based paint, or other type of paint can be used. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. When more than one layer of paint is used, the paint layers can be the same or different as to paint type, color, composition, reflectiveness, solid content, durability, drying time, etc. The one or more layers can be applied in a same or dissimilar method. For instance, one or more paint layers can be applied by a spraying process, and one or more other layers could be applied by a dipping process and/or some other process. Traditional dying paints or fast drying paints can be used. Generally the paint has a light color and a reflectivity, when dry, of at least about 75%. The application of the one or more layers of paint on the roofing system not only increases the resulting reflectivity of the roofing and/or siding system, the one or more paint layers a) fills in the uncovered regions of the roofing and/or siding system and spaces between the solid material on the roofing and/or siding material thereby reducing the amount of exposure of the low reflective materials (e.g., asphalt, bitumen, etc.), b) fills in the spacing between the solid material to form a more smooth roofing surface, which smoother surface can be more aesthetically pleasing and/or increase the effective reflectivity of the roofing and/or siding system, c) improve the bonding of the one or more layers of solid material to the roofing and/or siding system, d) increase the strength and/or durability of the roofing system, and/or e) provide additional sealing and/or insulative properties of the roofing and/or siding system. In one embodiment of the invention, the paint has a generally white color. In another and/or alternative embodiment of the invention, one or more layers of paint can be applied prior to, during and/or after the coating of the roofing and/or siding system with one or more coating layers of solid material. In one aspect of this embodiment, at least one layer of paint is applied to the surface of the roofing and/or siding system after all the coating layers of solid material have been applied. In another and/or alternative aspect of this embodiment, at least one layer of paint is applied to the surface of the roofing and/or siding system prior to the coating layers of solid material being applied. The paint can be allowed to fully or partially dry prior to applying one or more layers of solid material on the paint coating, or one or more layers of solid material can be applied immediately after the application of the paint coating. When the one or more layers of solid material are applied to the roofing and/or siding material prior to the paint coating being fully dried, the paint coating can facilitate in the adhesion of the solid material to the roofing and/or siding system. In still another and/or alternative aspect of this embodiment, at least one layer of paint is applied to the surface of the roofing and/or siding system after at least one layer of solid material is applied to the roofing and/or siding material, but prior to the application one or more additional coating layers of solid material. The paint can be allowed to fully or partially dry prior to applying one or more layers of solid material on the paint coating, or one or more layers of solid material can be applied immediately after the application of the paint coating. When the one or more layers of solid material are applied to the roofing and/or siding material prior to the paint coating being fully dried, the paint coating can facilitate in the adhesion of the solid material to the roofing and/or siding system. In still another and/or alternative embodiment of the invention, the one or more layers of paint can be applied at a thickness to achieve the desired physical properties (e.g., effective reflectivity, strength, solid material adhesion, etc.) of the roofing and/or siding system. When more than one layer of paint is applied, the thickness of each layer can be the same or different. For instance, if a layer a paint that is applied after at least one layer of solid material has been applied to the roofing and/or siding material, but before one or more other layers of solid material have been applied may have a thicker, thinner or the same paint coating thickness than a layer of paint that is later applied after all the layers of solid material have been applied to the roofing and/or siding system. The thickness of each wet paint layer is generally at least about 0.5 mils, and typically less than about 50 mils; however, other coating thickness can be used. The thickness of the paint layer can depend on one or more factors such as, but not limited to, the solids content of the paint, the reflectivity of the paint, the point in time of applying the paint during the formation of the roofing and/or siding system, the drying time of the paint, the type of roofing system, the desired effective reflectivity of the roofing and/or siding system, the desired surface roughness of the roofing and/or siding system, the amount of solid material adhesion provided by the paint coating, the cost of the roofing and/or siding system, the time and/or complexity of manufacturing the roofing and/or siding system, the flexibility of the roofing and/or siding system, etc.

It is a principal object of the present invention to provide an improved roofing and/or siding system that has a result or effective reflectivity of at least about 60%.

Another and/or alternative object of the present invention is the provision of a roofing and/or siding system having an exposed surface of highly reflective solid material.

Still another and/or alternative object of the present invention is the provision of a roofing and/or siding system that includes one or more layers of a highly reflective paint.

Yet another and/or alternative object of the present invention is the provision of a roofing and/or siding system that includes at least one layer of highly reflective paint that has been applied to the roofing and/or siding material prior to at least one layer of solid material being applied to the roofing and/or siding material.

Still yet another and/or alternative object of the present invention is the provision of a roofing and/or siding system having highly reflective properties that can be manufactured off-site and have the desired resulting or effective reflectivity without having to apply additional coating layers such as, but not limited to, a highly reflective paint on-site and/or after the roofing and/or siding system has been partially or fully installed on a building or other type of structure.

A further and/or alternative object of the present invention is the provision of a roofing and/or siding system which has a desired weatherability, desired strength and color stability as well as a desired heat stability.

Still a further and/or alternative object of the present invention is the provision of a roofing and/or siding system that is commercially feasible and economical to manufacture.

Yet a further and/or alternative object of the present invention is the provision of a roofing and/or siding system that is coated by a solid material by use of a multi-coating process.

Still yet a further and/or alternative object of the present invention is the provision of a roofing and/or siding system that has a reduced amount of surface exposure of low reflecting surfaces.

Another and/or alternative object of the present invention is the provision of a roofing and/or siding system that has a reduced surface temperature when exposed to sunlight.

Still another and/or alternative object of the present invention is the provision of a roofing and/or siding system that reduces energy costs associated with the cooling of a structure.

Yet another and/or alternative object of the present invention is the provision of a roofing and/or siding system that resists heat degradation.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF THE PREFERRED EMBODIMENTS

Figure 1:
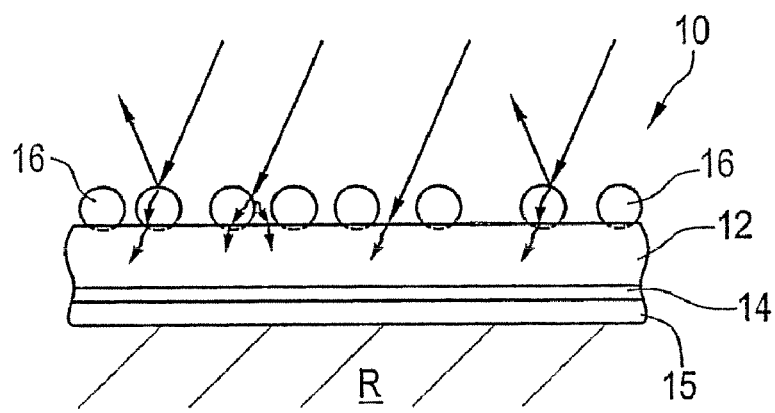
FIG. 1 is a side sectional view of a prior art roofing and/or siding system.

Referring now to the drawings wherein the showings are for the purpose of illustrating a preferred embodiment of the invention only and not for the purpose of limiting same, FIG. 1 illustrates a prior art roofing system 10. The roofing system 10 is secured to a roof, roof substrate (e.g., base sheets), or subroof R by any suitable arrangement. The roofing system 10 is a shingle that includes a bitumen- or asphalt-based material 12, 15, a reinforcement material 14 therebetween, and layer of granules 16. The reinforcement material 14 is typically a felt or fiberglass material that is commonly used in the art. The reinforcement material 14 is shown as fully embedded in the bitumen- or asphalt-based material 12. The granules 16 are illustrated as partially embedded and secured in the bitumen- or asphalt-based material 12. The granules are typical granules used in roofing materials. The granules are generally derived from a mineral base rock such as greenstone, greystone, nephylene syenite, gravel slate, gannister, granite, quartzite, andosite, rhyolite and the like. The granules may be coated to color the granules and/or provide the granules with antimicrobial resistance. The granules 16 are shown to be spherical and have the same size. In practice, the granules have a variety of different shapes. One common size of granules used on shingles is No. 11 grade particles. No. 11 grade particles are known in the industry to have a particle range of about 8×40 US mesh having an average mesh size of about 19 US mesh (i.e., 937 mm sieve designation).

Referring again to FIG. 1, much of the exposed surface of bitumen- or asphalt-based material 12 is covered by granules 16; however, there exists spaces between the granules. Typically about 90-98% of the exposed surface of bitumen- or asphalt-based material 12 is covered by granules 16. These spaces allow sunlight as indicated by the arrows to bypass the granules and contact the upper surface of bitumen- or asphalt-based material 12. The exposure of the bitumen- or asphalt-based material 12 to the sunlight results in absorption of much of the sunlight by the bitumen- or asphalt-based material 12, as indicated by the arrows, which lowers the reflectivity of the roofing system 10. The absorption of the sunlight by the bitumen- or asphalt-based material 12 can also increase the rate of degradation to the bitumen- or asphalt-based material 12, which can reduce the life of the roofing and/or siding system 10. The absorption of sunlight by the bitumen- or asphalt-based material 12 can also result in an increased temperature of the roofing and/or siding system 10, which temperature increase can accelerate the degradation of the bitumen- or asphalt-based material 12.

Referring again to FIG. 1, granules 16 are illustrated as reflecting some of the sunlight and allowing a portion of the sunlight to be transmitted through the granules, as indicated by the arrows, which is then absorbed by the bitumen- or asphalt-based material 12. The amount of absorption of light by the granules can be limited by the use of highly reflective granules. Non-limiting examples of highly reflective granules are illustrated in United States Patent Publication No. 2004/0071938 published on Apr. 15, 2004, which is incorporated herein by reference.

Figure 4:
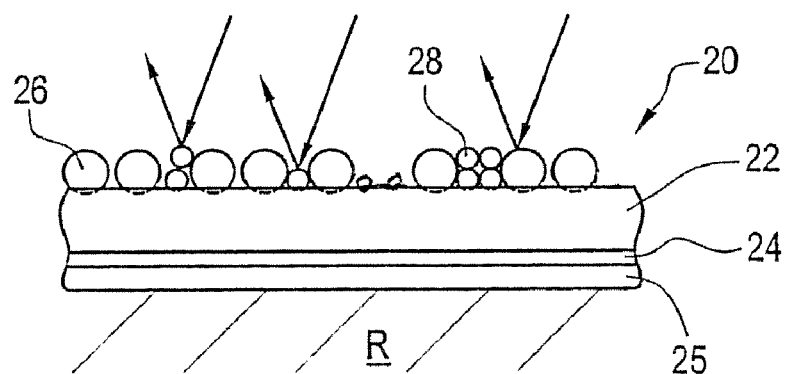
FIG. 4 is a side sectional view of a prior art roofing and/or siding system formed by multiple sized solid materials.

Referring now to FIG. 4, a roofing and/or siding system 20 is illustrated. The roofing and/or siding system 20 is secured to a roof, roof substrate, and/or subroof R by any suitable arrangement. As can be appreciated, roofing and/or siding system 20 can be secured to other surfaces such as, but not limited to, the side of a structure, the floor of a structure, a deck, a street, a sidewalk, a parking lot, a driveway, the ground, etc. The roofing and/or siding system 20 includes a top layer of bituminous composition 22, a reinforcement material 24, a bottom layer of bituminous composition 25, and granules 26. The roofing and/or siding system 20 can be roofing shingles, cap sheet roll roofing, or modified bitumen. The bituminous composition is typically bitumen and/or asphalt; however, other or additional constituents known in the art can be used. The thickness of the bituminous composition is selected to meet the desired end use of the roofing and/or siding system 20. The reinforcement material 24 can be any known fabric material, composite material, felt or fiberglass material, or additional or other material that is known in the art for use in roofing and/or siding systems. The composition, thickness, and/or arrangement of the reinforcement material 24 is selected to meet the desired end use of the roofing and/or siding system 20. For a modified bitumen roofing and/or siding system, reinforcement material 24 is typically a composite material; however, other or additional materials can be used. For a shingles, or cap sheet roll roofing and/or siding systems, reinforcement material 24 is typically a felt or fiberglass fiber material; however, other or additional materials can be used. The reinforcement material 24 is illustrated as fully embedded between the top and bottom layers of bituminous composition; however, this is not required. For instance, the bottom layer of bituminous composition can be eliminated. In addition, the composite material may only be partially embedded in the bituminous composition. As can also be appreciated, additional layers of composite material and/or bituminous composition can be used. The upper surface of the top layer of bituminous composition 22 includes two different sizes of granules 26, 28. Most of granules 26, 28 are illustrated as partially embedded and/or secured in the upper surface of bituminous composition 22. As can be appreciated, some of granules 26, 28 may be fully embedded in the bituminous composition and/or not embedded in the bituminous composition to meet the desired end use of the roofing and/or siding system 20. As illustrated in FIG. 4, granules 26 are substantially spherical. In practice, the granules have a variety of different shapes. The shape and size of granules 26 is merely illustrative. Likewise, granules 28 are shown to be spherical. In practice, the granules have a variety of different shapes. The shape and size of granules 28 is also merely illustrated to show that these granules have an average size that is less than the average size of granules 26.

Granules 26, 28 are made or and/or are coated with a highly reflective material that reflects most, if not all, of the sunlight that contacts the granules as shown by the arrows; however, this is not required. As illustrated in FIG. 4, more of the upper surface of bituminous composition 22 is covered by the granules that roofing system 10 of FIG. 1. As such roofing system 20 prevents more sunlight that is directed toward the roofing and/or siding system 20 from being absorbed by the bituminous composition 22. The smaller granules 28 occupy many of the spaces between the larger granules 26, thereby increasing the amount of coverage of the upper surface of the bituminous composition 22. The increased amount of granule coverage on the upper surface of the bituminous composition 22 is a significant improvement over the prior art roofing and/or siding system 20 as shown in FIG. 1. The increased coverage of the upper surface of the bituminous composition 22 increases the average reflectivity of the roofing and/or siding system, and can also reduce the rate of degradation of the bituminous composition 22, reduce the surface temperature of the roofing and/or siding system, and/or extend the life of the roofing and/or siding system. The increased coverage provided by the two sizes of granules can result in a 1-5% or more increase in resulting and/or effective reflectivity of the roofing and/or siding system. The size of granules 26 is selected to meet the desired end use of the roofing and/or siding system 20. One non-limiting example for shingles, cap sheet roll or modified bitumen roofing and/or siding systems is to use No. 11 grade particles or No. 14 grade particles (particle range of 12-40 US mesh and an average US mesh size of 22 US mesh (i.e., 754 mm sieve designation)) for granules 26, and to use 28×48 designated particles having an average US mesh size of about 50 US mesh (i.e., 304 mm sieve designation) for granules 28. As can be appreciated, other sized particles can be used for granules 26 and/or granules 28.

Figure 2:
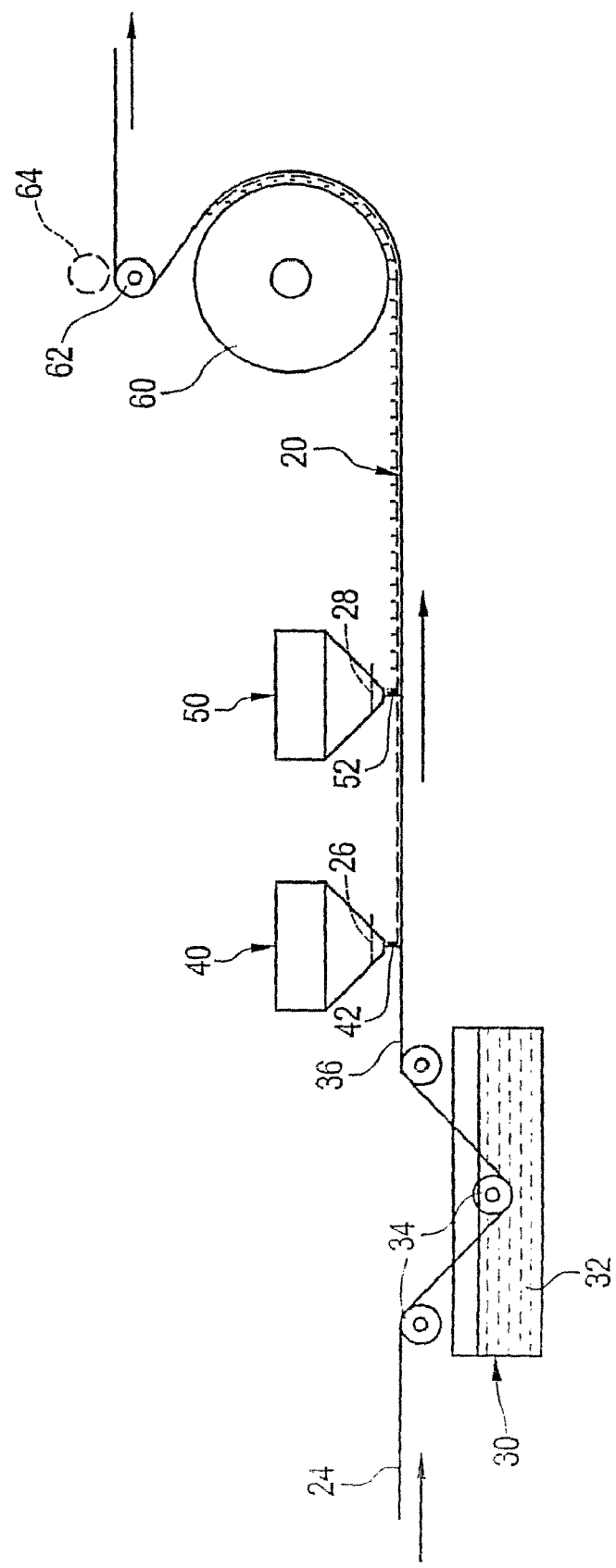
FIG. 2 is an elevation view of a prior art apparatus utilizing a dual solid material coating method.

Referring now to FIG. 2, there is illustrated an apparatus for forming a roofing and/or siding system 20 such as shingles, cap sheet roll roofing or modified bitumen by use of a multiple granular coating process as described in detail in United States Patent Publication No. 20040071938 published on Apr. 15, 2004. Reinforcement material 24 is passed through a coater 30 containing liquid bituminous composition 32 to at least partially impregnate the reinforcement material. As the reinforcement material 24 is passed through a coater 30, the reinforcement material is guided by one or more guide rollers 34, and a continuous hot bituminous coated strip 36 is formed. As can be appreciated, other processes can be used to coat the reinforcement material with the bituminous composition. As can also be appreciated, more than one coating of bituminous composition can be applied to the reinforcement material. The bituminous coated strip is then passed beneath a hopper 40 which applies granules 26 (primary granules) on the upper surface of the bituminous coated strip. These granules are typically highly reflective granules; however, this is not required. A gate 42 controls the amount of granules 26 that is deposited on the upper surface of the bituminous coated strip. As can be appreciated, many different types of devices can be used to control the spread pattern and/or amount of granules 26 being applied to the bituminous coated strip. The amount of granules 26 deposited on the upper surface of the bituminous coated strip is typically selected to cover most of the upper surface of the bituminous coated strip; however, this is not required. The coverage of granules 26 on the upper surface of the bituminous coated strip is generally represented by the coverage of granules 16 in FIG. 1. For instance, when No. 11 grade granules are used, the coverage provided by the granules is typically about 90-98% (ASTM D6225).

After granules 26 have been deposited on the upper surface of the bituminous coated strip, granules 28 (secondary granules) are then deposited on the upper surface of the bituminous coated strip as the bituminous coated strip passes under hopper 50. These granules are also typically highly reflective granules; however, this is not required. Granules 28 have a smaller average particle size than the particle size of granules 26. The amount of granules 28 deposited on the upper surface of the bituminous coated strip from hopper 50 is controlled by gate 52. As can be appreciated, many different types of devices can be used to control the spread pattern and/or amount of granules 28 being applied to the bituminous coated strip.

The amount of granules 28 deposited on the upper surface of the bituminous coated strip is typically selected to substantially fully cover the remaining exposed upper surface of the bituminous coated strip; however, other amounts of granules 28 can be used. Typically, the amount of granules 28 deposited on the upper surface of the bituminous coated strip is less than the amount of granules 26 deposited on the upper surface of the bituminous coated strip; however, this is not required. The smaller sized granules 28 are deposited on the upper surface of the bituminous coated strip between the spaces left by the previously deposited granules 26. After the smaller sized granules 28 are deposited on the upper surface of the bituminous layer, less than about 5% of the bituminous layer remains exposed, and typically less than about 2% of the bituminous layer remains exposed. As a result of this multiple coating, multiple size granule coating process, a significantly greater portion of the upper surface of the bituminous coated strip is coated by granules. The increased coverage of the bituminous layer provided by the two sizes of granules results in an increase in resulting or effective reflectively of the roofing and/or siding system 20. As can be appreciated, more than two layers of granules can be applied to the bituminous layer. Typically, the smaller sized granules are coated onto the bituminous layer after the larger sized particles have been applied; however, this is not required. The size ratio of granules 26 to granules 28 is generally at least about 1.5:1.

After the granules 26 and 28 are deposited on the upper surface of the bituminous coated strip, the bituminous coated strip is typically passed around a drum 60; however, this is not required. As the bituminous coated strip travels about drum 60, many of granules 26, 28 are at least partially pressed into the bituminous coated strip. Typically a majority of the granules are at least partially pressed into the bituminous coated strip. In addition, as the bituminous coated strip travels about drum 60, loosely adhered granules 26, 28 fall from the surface of the bituminous coated strip. These granules can be disposed of and/or recycled for later use. After bituminous strip passes around drum 60, the bituminous coated strip can be guided by one or more guide rollers 62 to a cooling section and/or pressing section, not shown. The cooling process is not required. One or more press rollers 64 can be used to at least partially press granules 26, 28 into the bituminous layer for improved adhesion of the granules to the roofing and/or siding system; however, this is not required. After the bituminous coated strip is cooled and/or pressed, the bituminous coated strip can be rolled up and/or formed into shingles. The process steps of cooling, pressing, rolling, and shingle formation are well known in the art, thus will not be described herein.

Figure 3:
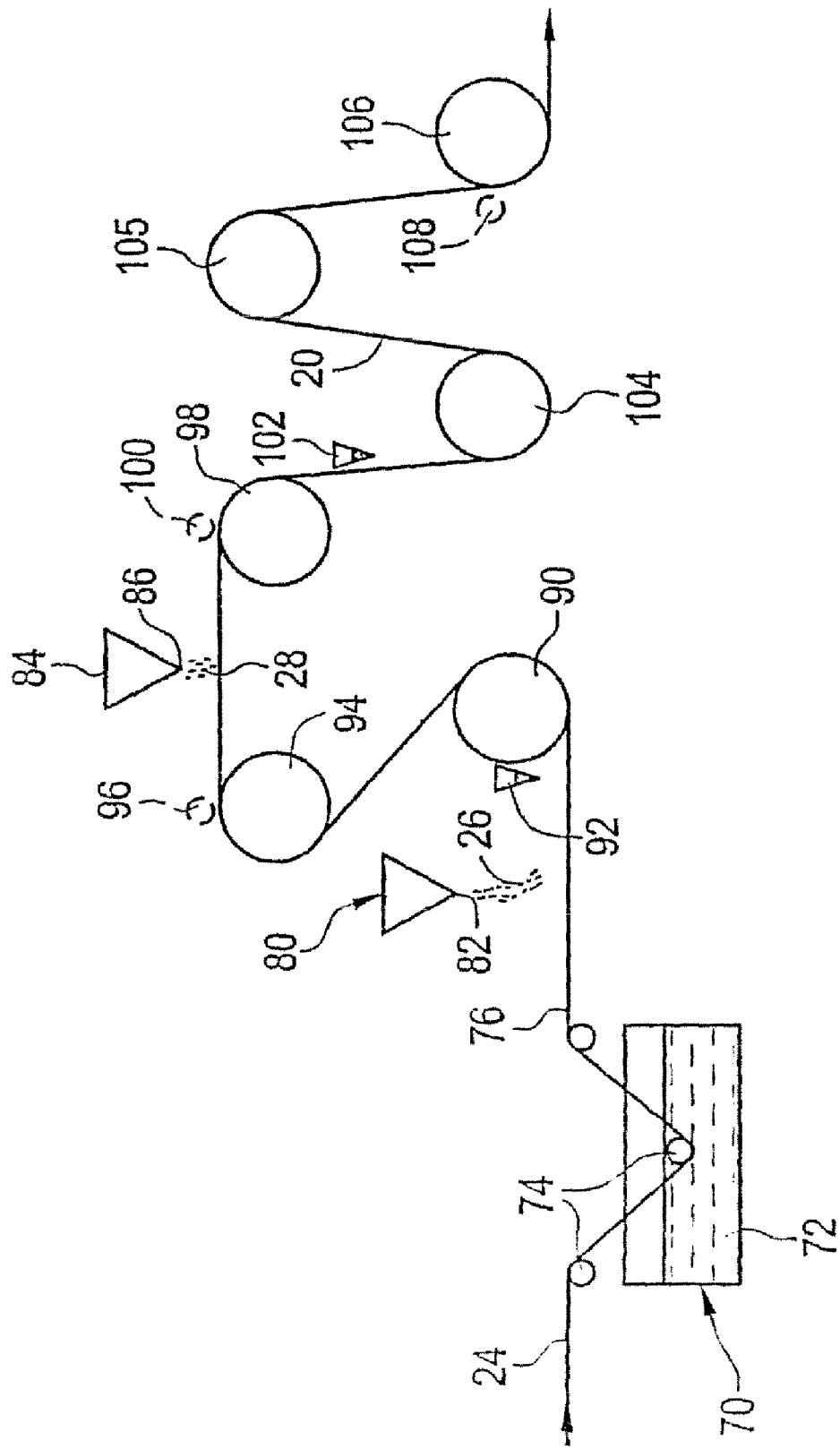
FIG. 3 is an elevation view of a alternative prior art apparatus utilizing a dual solid material coating method.

Referring now to FIG. 3, another apparatus is illustrated for forming a roofing and/or siding system 20 such as shingles, cap sheet roll roofing or modified bitumen as also described in detail in United States Patent Publication No. 2004/0071938 published on Apr. 15, 2004. Reinforcement material 24 is passed through a coater 70 containing a liquid bituminous composition 72 to at least partially impregnate the reinforcement material. As the reinforcement material 24 is passed through a coater 70, the reinforcement material is guided by one or more guide rollers 74 and a continuous hot bituminous coated strip 76 is formed. As can be appreciated, other processes can be used to coat the reinforcement material with the bituminous composition. As can also be appreciated, more than one coating of bituminous composition can be applied to the reinforcement material.

The bituminous coated strip is then passed beneath a hopper 80 which applies granules 26 (primary granules) on the upper surface of the bituminous coated strip. These granules are typically highly reflective granules; however, this is not required. A gate 82 controls the amount of granules 26 that is deposited on the upper surface of the bituminous coated strip. As can be appreciated, many different types of devices can be used to control the spread pattern and/or amount of granules 26 being applied to the bituminous coated strip. The amount of granules 26 deposited on the upper surface of the bituminous coated strip is typically selected to cover most of the upper surface of the bituminous coated strip; however, other amounts of granules 26 can be used. The amount of granules 26 deposited on the upper surface of the bituminous coated strip is typically selected to cover most of the upper surface of the bituminous coated strip; however, this is not required. The coverage of granules 26 on the upper surface of the bituminous coated strip is generally about 90-98% when No. 11 grade granules are used.

After granules 26 have been deposited on the upper surface of the bituminous coated strip, the bituminous coated strip is passed about a drum 90; however, this is not required. As the bituminous coated strip travels about drum 90, many of granules 26 are at least partially pressed into the bituminous coated strip. Typically a majority of granules 26 are at least partially pressed into the bituminous coated strip; however, this is not required. As the bituminous coated strip travels about drum 90, loosely adhered granules 26 fall from the surface of the bituminous coated strip. These granules can be disposed of and/or recycled for later use. The fallen granules expose regions in the bituminous layer that are not covered by granules 26. These exposed regions can be better filled by smaller granules that are subsequently applied to the bituminous layer than applying another layer of granules 26. It has been found that in many of the final products, there is increased coverage of the bituminous layer when loose granules 26 are removed prior to applying granules 28; however, such prior removal of loose granules 26 is not required. As illustrated in FIG. 3, there is a hopper 92 positioned adjacently to drum 90. Hopper 92 is used to collect the loose granules for disposal and/or for later use. As can be appreciated, the use of hopper 92 is optional.

After the bituminous coated strip passes around drum 90, the bituminous coated strip is fed to drum 94; however, this is not required. The path of the bituminous coated strip between drums 90 and 92 is illustrated as an "S" shape; however, other shaped paths for the bituminous coated strip can be used. As the bituminous coated strip passes about drum 94, the bituminous coated strip passes under press roller 96; however, this is not required. Press roller 96 is used to at least partially press granules 26 into the bituminous layer for improved adhesion of the granules to the roofing and/or siding system. Use of press roller 96 results in granules 26 twice being at least partially pressed into the bituminous coated strip (i.e., first by drum 90 and second by press roller 96 and drum 94). As can be appreciated, the use of press roller 96 is optional. Typically after the bituminous coated strip passes under press roller 96, a majority of granules 26 are partially embedded in the bituminous layer.

After bituminous coated strip passes about drum 94, granules 28 (secondary granules) are then deposited on the upper surface of the bituminous coated strip as the bituminous coated strip passes under hopper 84. These granules are typically highly reflective granules; however, this is not required. The amount of granules 28 deposited on the upper surface of the bituminous coated strip from hopper 84 is controlled by gate 86. As can be appreciated, many different types of devices can be used to control the spread pattern and/or amount of granules 28 being applied to the bituminous coated strip. The amount of granules 28 deposited on the upper surface of the bituminous coated strip is typically selected to substantially fully cover the exposed upper surface of the bituminous coated strip; however, this is not required. Typically, the amount of granules 28 deposited on the upper surface of the bituminous coated strip is less than the amount of granules 26 deposited on the upper surface of the bituminous coated strip; however, this is not required. The smaller sized granules 28 are typically deposited on the upper surface of the bituminous coated strip between previously deposited granules 26. These smaller sized granules are better able to occupy the spaces between larger granules 26 as illustrated in FIG. 3. After the smaller sized granules 28 are deposited on the upper surface of the bituminous layer, less than about 5% of the bituminous layer remains exposed, and typically less than about 2% of the bituminous layer remains exposed. The reduced amount of exposure of the bituminous layer results in an increase in resulting or effective reflectivity of the roofing system.

As can be appreciated, additional coatings of granules can be applied to the bituminous layer to attempt to increase the coverage by the granules; however, this is not required. Typically, the smaller sized granules are coated onto the bituminous layer after the larger sized particles have been applied; however, this is not required. As a result of this multiple coating, multiple size granule coating process, a significantly greater portion of the upper surface of the bituminous coated strip is coated by granules.

Referring again to FIG. 3, after the bituminous coated strip passes under hopper 84, the bituminous coated strip travels to drum 98. Positioned adjacently to drum 98 is a press roller 100. Press roller 100 is used to at least partially press and at least partially embed newly applied granules 28 in the bituminous layer. Press roller 100 will also at least partially press and at least partially embed granules 26 in the bituminous layer. Typically after the bituminous coated strip passes press roller 100, a majority of the granules are partially embedded in the bituminous layer. As can be appreciated, the use of press roller 100 is optional. As the bituminous coated strip passes about drum 98, loosely adhered granules 26, 28 fall from the surface of the bituminous coated strip. As can be appreciated, the use of drum 98 is optional. The fallen granules can be disposed of and/or recycled for later use. As illustrated in FIG. 3, there is a hopper 102 positioned adjacently to drum 98. Hopper 102 is used to collect the loose granules for disposal and/or for later use. As can be appreciated, the use of hopper 102 is optional.

Once the bituminous coated strip passes about drum 98, the bituminous coated strip is typically guided by one or more guide rollers to a cooling section and/or pressing section; however, these are not required. As illustrated in FIG. 3, the bituminous coated strip passes about drums 104, 105, 106. As the bituminous coated strip passes about these drums, granules 26, 28 are further at least partially pressed and partially embedded in the bituminous layer, and/or loose granules fall from the bituminous coated strip. As can be appreciated, the use of drums 104, 105 and/or 106 is optional. Another press roller 106 is illustrated as positioned adjacently to drum 106. The press roller is used to partially press and at least partially embed granules 26, 28 in the bituminous layer. As can be appreciated, press roller 108 is optional.

After the bituminous coated strip is cooled and/or pressed, the bituminous coated strip is rolled up and/or formed into shingles. The process steps of cooling, pressing, rolling, and shingle formation are well known in the art, thus will not be described herein.

The process described above can be used to form a roofing material have high reflectivity. For instance, when highly reflective granules having a size designation of 12×40 having an average particle size of about 19 US mesh (i.e., 958 mm sieve designation) are used for granules 26 and highly reflective granules having a size designation of 40×70 having an average particle size of about 47 US mesh (i.e., 330 mm sieve designation) are used for granules 28, the coverage of the bituminous layer by granules 26, 28 is more than 98% and has a resulting reflectivity of about 55%. Such a product is offered by The Garland Company under the name StressPly EUV with Star Burst Minerals. Although this product by The Garland Company is a significant improvement in the resulting reflectivity of roofing materials having a bituminous layer, this resulting reflectivity is below the minimum required resulting reflectivity of 65% required by many communities or states to classify the roofing system as a "cool roof." The minimum required resulting reflectivity of roofing systems in California to be classified as a "cool roof" is proposed to be 70%.

Figure 5:
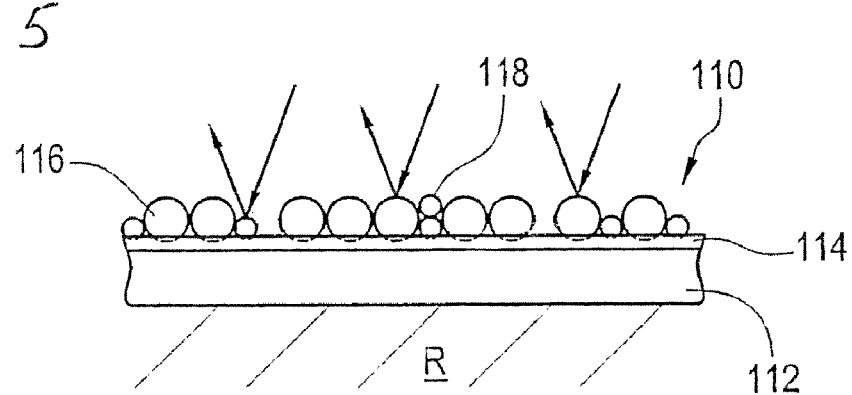
FIG. 5 is a side sectional view of another prior art roofing and/or siding system formed by multiple sized solid materials.

Referring now to FIG. 5, another roofing and/or siding system 110 is illustrated. Roofing and/or siding system 110 is a metal, plastic and/or wood roofing and/or siding system. The roofing and/or siding system 110 is secured to a roof or subroof R by any suitable arrangement. The roofing and/or siding system 110 includes a base substrate 112 such as, but not limited to, a sheet of plastic, metal or wood. The base substrate is typically a rigid or semi-rigid structure. The thickness of the base substrate is selected to meet the desired end use of the roofing and/or siding system 110. Applied to the top surface of the base substrate is an adhesive layer 114. The adhesive layer can be formed by any type of adhesive desirable. Some non-limiting examples include, but are not limited to, polymer adhesives, glue, bitumen, asphalt, etc. The thickness of the adhesive layer is selected to meet the desired end use of the roofing and/or siding system 110. Granules 116, 118 are coated on the adhesive layer and secured to the base substrate by the adhesive layer. These granules are typically highly reflective granules; however, this is not required. As can be appreciated, some of granules 116, 118 may be fully or partially embedded in the adhesive layer and/or not embedded in the adhesive layer. Typically a majority of the granules 116, 118 are partially embedded in the adhesive layer. The composition, size, layer thickness, and/or physical properties of the granules are selected to meet the desired end use of the roofing and/or siding system 110. As illustrated in FIG. 5, granules 116 are substantially spherical. In practice, the granules have a variety of different shapes. Likewise, granules 118 are shown to be spherical. In practice, the granules have a variety of different shapes. The relative size of granules 116 and 118 are illustrated merely to show that one size of granule is larger than another. Granules 116, 118 are made of and/or are coated with a highly reflective material that reflects most of the sunlight that contacts the granules as shown by the arrows; however, this is not required. Most of the upper surface of adhesive layer 114 is covered by the granules, thereby preventing most of the sunlight directed toward the roofing and/or siding system 110 from contacting and/or being absorbed by the base substrate 112. As can be appreciated, the adhesive layer can be formulated so as to at least partially function as a reflective layer to further prevent sunlight from contacting and/or being absorbed by the base substrate 112.

Referring again to FIG. 5, smaller granules 118 occupy the spaces between the larger granules 116, thereby increasing the amount of coverage of the adhesive layer 112. The increased coverage provided by the granules typically results in a 1-5% or more increase in reflectivity of the roofing and/or siding system. The increased coverage of the adhesive layer 114 can also reduce the rate of degradation of the base substrate 112, reduce the surface temperature of the roofing and/or siding system, and/or extend the life of the roofing system. The size of granules 116 is selected to meet the desired end use of the roofing and/or siding system 110. In one non-limiting example, granules 116 are No. 11 grade particles or No. 14 grade particles; however, other sizes can be used. The size of granules 118 is selected to have an average particle size of less than the average particle size of granules 116. One non-limiting example would be to use a particle designation of 12×40 having an average US mesh size of about 19 US mesh for granules 116 and a particle designation of 28×48 having an average US mesh size of about 50 US mesh (i.e., 304 mm sieve designation) for granules 118. Although this roofing system is a significant improvement in the resulting reflectivity of such roofing systems, the resulting reflectivity typically is below the minimum required resulting reflectivity of 65% required by many communities or states to classify the roofing system as a "cool roof."

As previously stated, the resulting reflectivity of the various roofing systems described above can be increased by the use of highly reflective granules. White granules such as offered by 3M have a reflectivity in the range of about 28 to about 30%. Granules such as those described in United States Patent Publication No. 2004/0071938 have a higher reflectivity, thereby increasing the resulting reflectivity of the roofing system. These materials include, but are not limited to, Grog, Mullite, tabular alumina, and/or crushed white porcelain.

Grog is a recycled alumina scrap from fire brick and kiln furnaces. Grog has an off-white color. Grog includes a majority of aluminum in the form of aluminum oxide. Grog can include other components such as silicon in the form of silica, iron oxide, calcium oxide, magnesium oxide, titanium oxide and other materials. One particular form of Grog is set forth as follows:

| Component | Weight % Range | Typical |
|---|---|---|
| $Al_2O_3$ | 86-93 | 89 |
| $SiO_2$ | 5-12.4 | 8.5 |
| $Fe_2O_3$ | 0.1-0.5 | 0.3 |
| CaO | 0.1-1 | 0.5 |
| MgO | 0.04-0.8 | 0.5 |
| $TiO_2$ | 0.1-1 | 0.7 |
| Alkalies | 0.1-0.5 | 0.3 |

The weight percent ratio of aluminum to silicon in the Grog is generally at least about 2:1, and typically about 2.2-30:1, and more typically about 2.3-20:1. The weight percent of aluminum and silicon in the Grog is generally at least about 75%, typically at least about 85%, and more typically at least about 90%. Grog has a reflectivity of generally at least about 55%, typically at least about 60%, and more typically about 65-70%. When Grog is used on a roofing and/or siding system, the resulting reflectivity of the roofing and/or siding system is generally more than 45%, typically at least about 50%, and more typically about 56-60%.

Mullite is a white calcined mineral that includes a majority of aluminum and silicon in the form of aluminum oxide and silica. Mullite can include other components such as iron oxide, calcium oxide, magnesium oxide, titanium oxide, sodium oxide, potassium oxide, and other materials. One particular form of Mullite is set forth as follows:

| Component | Weight % Range | Typical |
|---|---|---|
| $Al_2O_3$ | at least 45 | 45.1 |
| $SiO_2$ | up to 54 | 53.1 |
| $Fe_2O_3$ | up to 0.5 | 0.29 |
| CaO | up to 0.1 | 0.09 |
| MgO | up to 0.1 | 0.05 |
| $TiO_2$ | up to 0.8 | 0.56 |
| $Na_2O$ | up to 0.05 | 0.04 |
| $K_2O$ | up to 0.03 | 0.01 |

Another particular form of Mullite is set forth as follows:

| Component | Weight % Range | Typical "47" | Typical "60" | Typical "70" | Typical "HP" |
|---|---|---|---|---|---|
| $Al_2O_3$ | 45-74 | 47.2 | 60 | 70.5 | 73.16 |
| $SiO_2$ | 20-52 | 50.1 | 37.3 | 24.6 | 24.52 |
| $Fe_2O_3$ | 0.3-1.3 | 0.5 | 0.5 | 0.5 | 0.4 |
| CaO | up to 0.1 | | | | Trace |
| MgO | up to 0.1 | | | | |
| $TiO_2$ | up to 3 | 2.5 | 2.3 | 2.75 | 0.35 |
| $Na_2O + K_2O$ | up to 0.65 | | | | 0.65 |

The weight percent ratio of aluminum to silicon in the Mullite is generally at least about 0.7:1, and typically about 0.8-10:1, and more typically about 0.8-5:1. The weight percent of aluminum and silicon in the Mullite is generally at least about 80%, typically at least about 90%, and more typically at least about 93%. Mullite has a reflectivity of generally at least about 55%, typically at least about 60%, and more typically about 68-70%. When Mullite is used on a roofing and/or siding system, the resulting reflectivity on the roofing and/or siding system is generally over about 45%, typically at least about 50%, and more typically about 55-65%.

Tabular alumina c includes a majority of aluminum in the form of aluminum oxide. Tabular alumina can include other components such as silica, iron oxide, calcium oxide, sodium oxide, and other materials. One particular form of tabular alumina is set forth as follows:

| Component | Weight % Range | Typical |
|---|---|---|
| $Al_2O_3$ | at least 99 | 99.7 |
| $SiO_2$ | up to 0.1 | 0.03 |
| $Fe_2O_3$ | up to 0.15 | 0.13 |
| CaO | up to 0.12 | 0.04 |
| $Na_2O$ | up to 0.35 | 0.26 |

The weight percent ratio of aluminum to silicon in the tabular alumina is generally at least about 9:1, and typically about 15-8000:1, and more typically about 50-4000:1. The weight percent of aluminum and silicon in the tabular alumina is generally at least about 90%, typically at least about 95%, and more typically at least about 98%. Tabular alumina has a reflectivity of generally at least about 55%, typically at least about 65%, and more typically about 70-85%. When tabular alumina is used on a roofing and/or siding system, the resulting reflectivity on the roofing and/or siding system is generally more than 45%, typically at least about 50%, and more typically about 52-60%.

Crushed porcelain is typically from broken or recycled white dinnerware. As a result, the granules of the present invention can be a recycled material. The crushed porcelain typically has an aluminum oxide content of at least about 25 weight percent. The weight percent ratio of aluminum to silicon in the crushed white porcelain is generally at least about 0.2:1, and typically about 0.25-2:1, and more typically about 0.2-5-1:1. The weight percent of aluminum and silicon in the crushed white porcelain is generally at least about 75%, typically at least about 80%, and more typically at least about 85%. White crushed porcelain has a reflectivity of generally at least about 55%, typically at least about 60%, and typically about 65-70%, When crushed white porcelain is used on a roofing and/or siding system, the resulting reflectivity on the roofing and/or siding system is generally at over about 45%, typically at least about 48%, and more typically about 50-55%. As can be appreciated, other types or white china or dinnerware can be used so long such china and dinnerware has a sufficiently high reflectiveness.

Prior to the present invention, if the roofing or siding materials did not have a resulting or effective reflectivity of 65%, the application of a highly reflective paint had to be applied to the surface of the roofing or siding system to increase the resulting or effective reflectivity of the roofing or siding system. Although the application of a paint layer could be used to obtain a resulting reflectivity of 65% or greater, the thickness of the applied paint layer typically had to be greater than about 12 mils of wet paint and typically about 12-32 mils for granular coated roofing systems the consisted of shingles, cap sheet roll roofing or modified bitumen. The paint layer thickness on metal, plastic or wood roofing systems varied depending on the size of the granules and the color of the metal, plastic or wood substrate. Typically the thickness of the wet paint layer applied to such roofing systems was greater than about 10 mils. This large amount of paint typically was cost prohibitive to use due the expense of the large quantity of paint and the cost of labor to prepare the roofing or siding system for the paint and the applying of the paint to the roofing or siding system. The present invention overcomes these limitations of past roofing systems by the development of a roofing system and/or siding system and a method of forming or manufacturing such a roofing and/or siding system that requires significantly less paint, thus reducing the material and labor cost to form a highly reflective roofing system on-site. In addition, the present invention is directed to some prefabricated roofing and/or siding systems that can be manufactured off-site and have the desired resulting or effective reflectivity so that the need for applying a paint on-site is eliminated, thus saving labor costs during the installation of the roofing and/or siding system.

Reference is now made to FIGS. 6-9 which illustrate a shingle, cap sheet roll roofing material or modified bitumen roofing material 200. The roofing material 200 is designed to be secured to a roof, roof substrate (e.g., base sheets), or subroof R by any suitable arrangement. The roofing material 200 includes a bitumen- or asphalt-based material 202, 204, a reinforcement material 206 therebetween, and layer of granules 208. The reinforcement material 206 is typically a felt or fiberglass material that is commonly used in the art; however, other materials can be used. The reinforcement material 206 is shown as fully embedded in the bitumen- or asphalt-based material 202. The granules 208 are illustrated as partially embedded and secured in the bitumen- or asphalt-based material 202. The granules can be typical granules used in roofing materials or highly reflective granules. In the particular embodiment described herein, granules 208 are highly reflective granules similar to or the same as the highly reflective granules disclosed in United States Patent Publication No. 20040071938 published on Apr. 15, 2004, which is incorporated herein by reference. These high reflective granules have an average reflectivity of at least about 45%, and typically at least about 50%. The granules 208 are shown to be spherical and have the same size. In practice, the granules have a variety of different shapes. One common size of granules used on shingles is No. 11 grade particles. No. 11 grade particles are known in the industry to have a particle range of about 8×40 US mesh having an average mesh size of about 19 US mesh (i.e., 937 mm sieve designation).

Referring again to FIG. 6, much of the exposed surface of bitumen- or asphalt-based material 202 is covered by granules 208; however, there exists spaces between the granules. Generally a majority of the surface of the bitumen- or asphalt-based material 202 is covered by granules 208. Typically about 90-98% of the exposed surface of bitumen- or asphalt-based material 202 is covered by granules 108. The coverage provided by the highly reflective granules reduces the amount of exposed black surface from the bitumen- or asphalt-based material 202, thereby increasing the resulting or effective reflectivity of roofing material 200. Although much of the surface of the bitumen- or asphalt-based material 202 is covered by granules 208, spaces exist between some of granules 208 which exposes the bitumen- or asphalt-based material 202. These spaces allow sunlight to bypass the granules and contact the upper surface of bitumen- or asphalt-based material 202. The exposure of the bitumen- or asphalt-based material 202 to the sunlight results in absorption of much of the sunlight by the bitumen- or asphalt-based material 202, which lowers the resulting or effective reflectivity of the roofing material 200. The absorption of the sunlight by the bitumen- or asphalt-based material 202 can also increase the rate of degradation to the bitumen- or asphalt-based material 202, which can reduce the life of the roofing material 200. The absorption of sunlight by the bitumen- or asphalt-based material 202 can also result in an increased temperature of the roofing material 200, which temperature increase can accelerate the degradation of the bitumen- or asphalt-based material 202.

Figure 6:
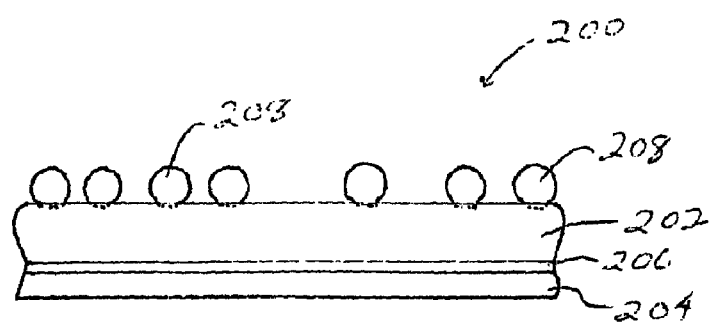
FIG. 6 is a side sectional view of a prior art roofing and/or siding system illustrating the initial formation of the roofing and/or siding system in accordance with the present invention.
Figure 7:
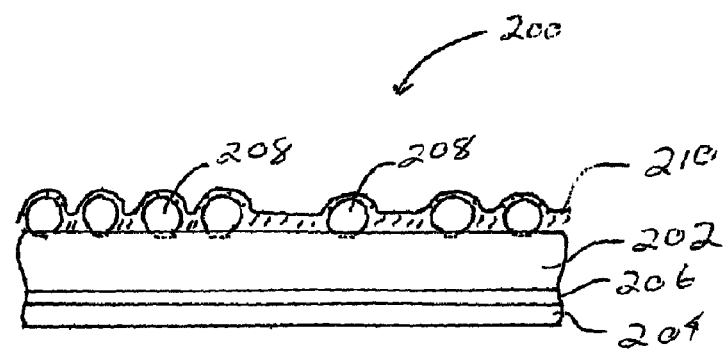
FIG. 7 is a side sectional view of a roofing and/or siding system illustrating a layer of paint applied to the roofing and/or siding system in accordance with the present invention.

Referring now to FIG. 7, roofing material 200 of FIG. 6 is illustrated as including a layer of paint 210. The paint layer can be applied in a single application or by multiple applications. The paint layer can be applied in many different ways such as, but not limited to, spray coating, dipping, pouring and subsequently spreading, etc. If more that a single application is used to apply the paint layer, the process for applying each layer can be the same or different.

Paint 210 is a highly reflective paint that has a reflectivity of at least about 70% when dry. Typically the paint color is white; however, this is not required. The paint layer is shown to be applied after granules 208 have been applied to the surface of bitumen- or asphalt-based material 202. As can be appreciated, a layer of paint can additionally or alternatively be applied to the bitumen- or asphalt-based material 202 prior to applying the layer of granules 208. If the paint layer is applied to the bitumen- or asphalt-based material 202 prior to applying the layer of granules 208, the granules are typically applied to the paint layer prior to the paint layer fully drying so as to facilitate in the adhesion of the granules to the surface of the roofing material; however, this is not required. Indeed, if the granules are applied after the paint has substantially or fully dried, a binder can be used to facilitate in the adhesion of the granules to the top surface of the roofing material.

As shown in FIG. 7, the layer of paint at least partially coats many of granules 208 and at least partially fills in the spaces between granules 208. Typically a majority of granules 208 are at least partially coated with the paint and a majority of the spaces between the granules are at least partially filled in by the paint. The paint layer not only increases the resulting reflectivity of the roofing material, the paint layer facilitates in the binding of the granules to the roofing material, increases the strength and/or durability of the roofing material, positively affects the aesthetic properties of the roofing material, and/or positively affects other properties of the roofing material.

Figure 10:
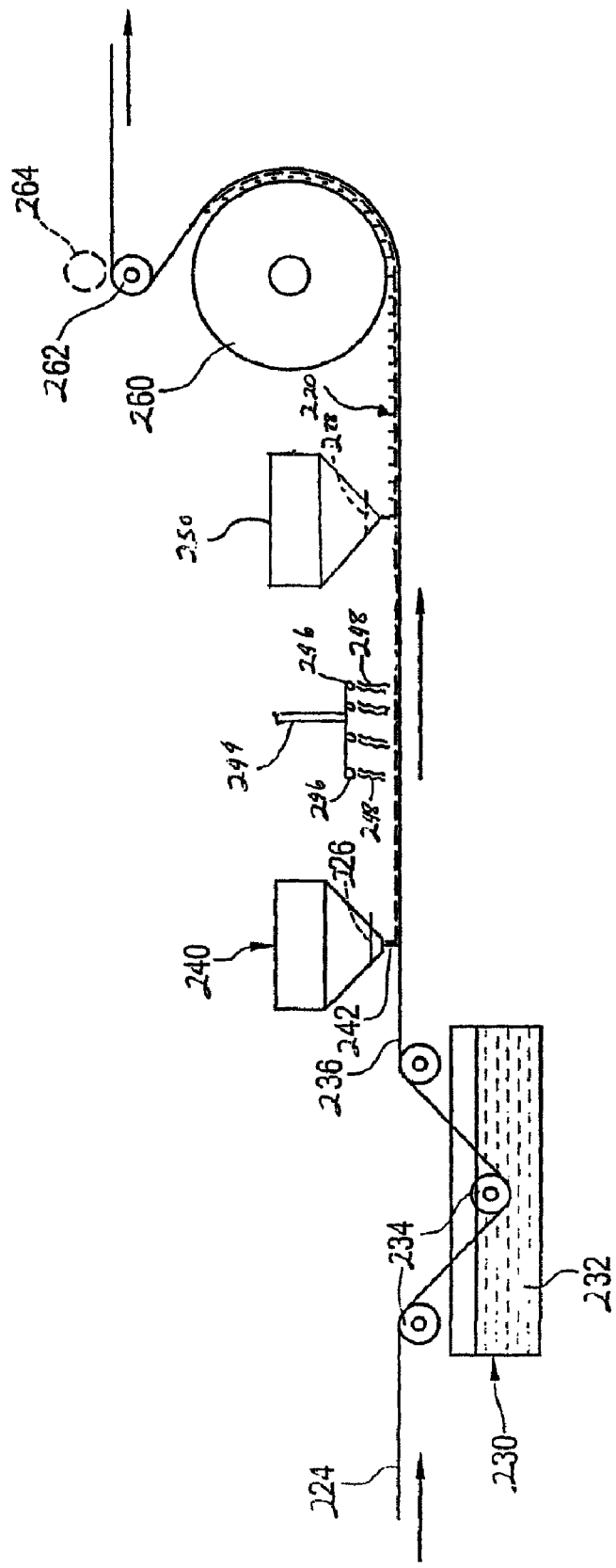
FIG. 10 is an elevation view of an apparatus utilizing the coating method of the present invention to form the roofing and/or siding material as shown in FIGS. 8 and 9; and, FIG. 11 is an elevation view of an alternative apparatus utilizing the coating method of the present invention to form the roofing and/or siding material as shown in FIGS. 8 and 9.
Figure 11:
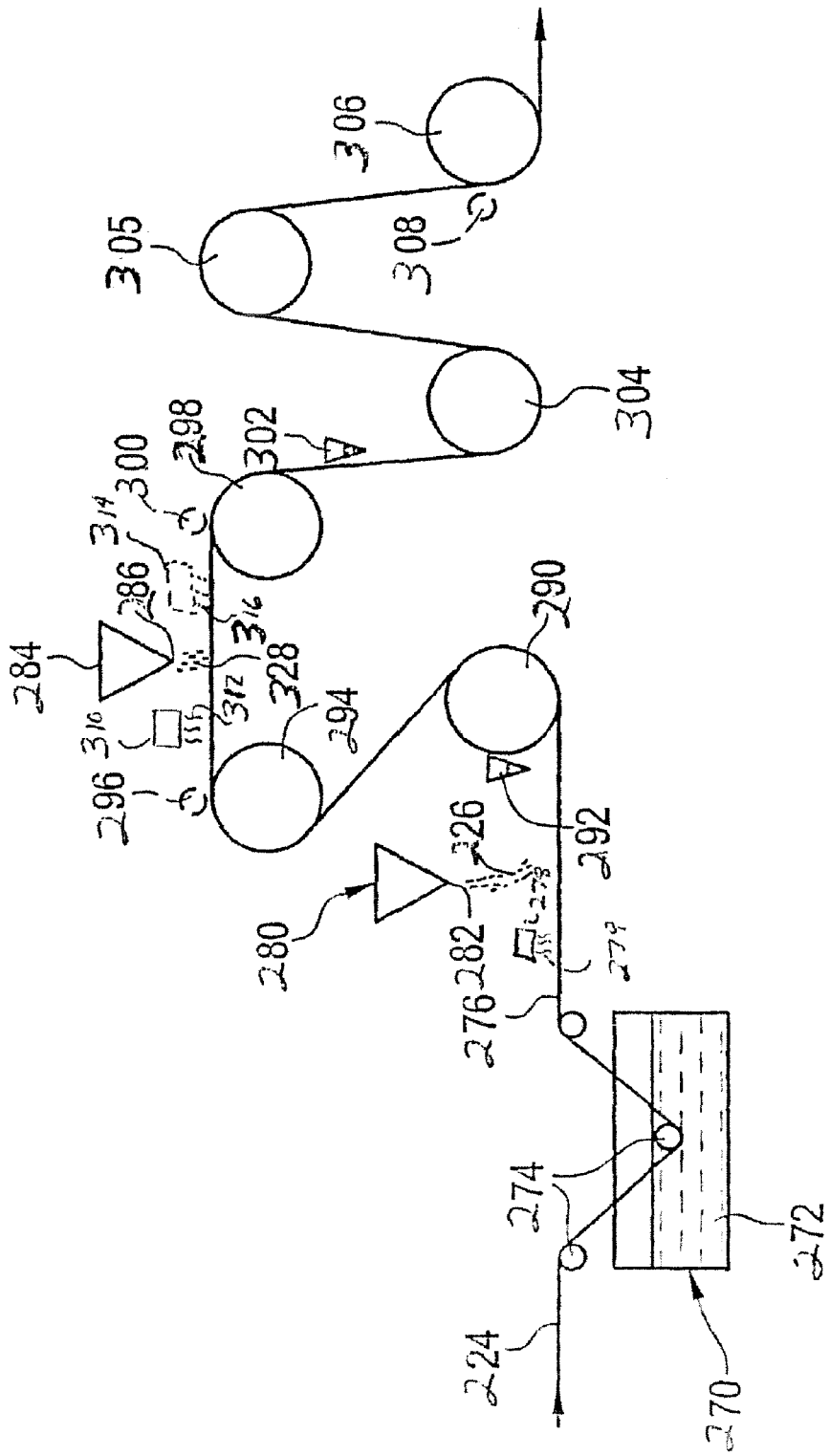

As illustrated in FIG. 7, the thickness of the paint layer is thinner on the top surfaces of granules 208 than the thickness of the paint layer between the granules. This varying of thickness is due in part to the viscosity of the paint. FIG. 7 also illustrates that the thickness of the paint layer between granules 208 is less than the height of granules 208 that are extending above the surface of the bitumen- or asphalt-based material 202. As such, the roofing material maintains a non-smooth texture. However, the filling of the spaces by the paint does form a smoother top surface of the roofing material. As can be appreciated, the amount of paint applied to the top of the roofing material can be controlled to a) form a smooth top surface wherein the paint layer in the spaces between the granules equals or exceeds the height of granules 208 that are extending above the surface of the bitumen- or asphalt-based material 202, or b) form a textured surface as shown in FIG. 7. The degree of roughness of the roofing material can be in part controlled by the thickness of the paint layer. It has been found that smoother the top surfaces of the roofing material which include a partially exposed highly reflective paint layer have a greater resulting or effective reflectivity than less smooth top surfaces. The thickness of the wet paint layer is typically at least about 0.5 mils (approximately 0.03 gal./100 ft$^2$). Typically the wet paint layer is less than about 50 mils (approximately 3.13 gal./100 ft$^2$); however, this is not required. In one non-limiting example, the thickness of the wet paint layer from a paint having a reflectivity of at least about 75% to form a roofing material having a resulting reflectivity that exceeds about 65% is about 5-25 mils. The thickness of the dried paint layer generally depends on the amount of solids in the paint. For example, a paint having about 62% solids has a dried layer thickness of about 20 mils from a 32 mils thick wet paint layer. It has been found that a single layer of granules in combination with a layer of highly reflective paint can form a roofing material having a resulting reflectivity of 65% or greater. This highly reflective roofing material can be formed by a manufacturing process at a site that is remote to the site that the roofing materials are to be installed. Two non-limiting examples of a manufacturing process that can be used to form this roofing material are illustrated in FIGS. 10 and 11, which will be described in detail below. The roofing material formed by an off-site manufacturing process (e.g., prefabrication process) has a resulting reflectivity when applied to a roof of a building or other type of structure without having to further treat the surface of the roofing material.

The type of paint used on the roofing material is limited only to the ability of the paint to properly bind to the bitumen- or asphalt-based material 202 and/or granules 208. The paint can be a water-based paint, latex-based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required.

As described so far above, the roofing material is a shingle, cap sheet roll roofing material or modified bitumen roofing material. It will be appreciated that the broad concept of the invention can be applied to other types of roofing systems. As can be appreciated, the concept of the present invention can also be used on wood, plastic or metal roofing systems. The highly reflective paint can be applied prior to and/or after the granules are applied to the wood, plastic or metal roofing system to obtain a highly reflective roof material. This roofing material could be manufactured off-site (e.g., prefabricated).

Figure 8:
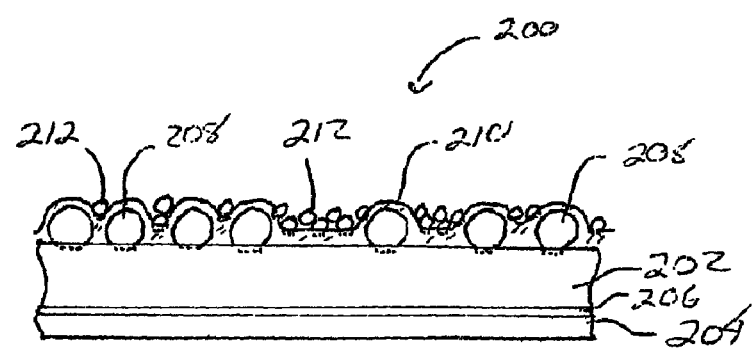
FIG. 8 is a side sectional view of another roofing and/or siding system illustrating a layer solid material applied onto the layer of paint in accordance with the present invention.

Referring now to FIG. 8, another embodiment of roofing material 200 is illustrated. In this embodiment, the structure of the roofing material is similar to the roofing material illustrated in FIG. 7, but includes an additional layer of granules 212. The upper surface of the top layer of bitumen- or asphalt-based material 202 includes two different sizes of granules 208, 212. As described above with respect to FIGS. 6 and 7, a majority of the granules 208 are partially embedded in layer 202; however, this is not required. As stated above, the paint layer 210 can be applied in a single application or by multiple applications. The paint layer can be applied in many different ways such as, but not limited to, spray coating, dipping, pouring and subsequently spreading, etc. If more that a single application is used to apply the paint layer, the process for applying each layer can be the same or different.

Paint 210 is a highly reflective paint that has a reflectivity of at least about 70% when dry. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required. The paint layer is shown to be applied after granules 208 have been applied to the surface of bitumen- or asphalt-based material 202. As can be appreciated, a layer of paint can additionally or alternatively be applied to the bitumen- or asphalt-based material 202 prior to applying the layer of granules 208. If the paint layer is applied to the bitumen- or asphalt-based material 202 prior to applying the layer of granules 208, the granules are typically applied to the paint layer prior to the paint layer fully drying so as to facilitate in the adhesion of the granules to the surface of the roofing material; however, this is not required. Indeed, if the granules are applied after the paint has substantially or fully dried, a binder can be used to facilitate in the adhesion of the granules to the top surface of the roofing material.

As shown in FIG. 8, the layer of paint at least partially coats many of granules 208 and at least partially fills in the spaces between granules 208. Typically a majority of granules 208 are at least partially coated with the paint and a majority of the spaces between the granules are at least partially filled in by the paint. The paint layer not only increases the resulting reflectivity of the roofing material, the paint layer facilitates in the binding of the granules to the roofing material, increases the strength and/or durability of the roofing material, positively affects the aesthetic properties of the roofing material, and/or positively affects other properties of the roofing material.

As illustrated in FIG. 8, the thickness of the paint layer is thinner on the top surfaces of granules 208 than the thickness of the paint layer between the granules. This varying of thickness is due in part to the viscosity of the paint. FIG. 8 also illustrates that the thickness of the paint layer between granules 208 is less than the height of granules 208 that are extending above the surface of the bitumen- or asphalt-based material 202. As such, the roofing material maintains a non-smooth texture. However, the filling of the spaces by the paint does form a smoother top surface of the roofing material. As can be appreciated, the amount of paint applied to the top of the roofing material can be controlled to a) form a smooth top surface wherein the paint layer in the spaces between the granules equals or exceeds the height of granules 208 that are extending above the surface of the bitumen- or asphalt-based material 202, or b) form a textured surface as shown in FIG. 8. The degree of roughness of the roofing material can be in part controlled by the thickness of the paint layer. It has been found that smoother the top surfaces of the roofing material which include a partially exposed highly reflective paint layer have a greater resulting or effective reflectivity than less smooth top surfaces. The thickness of the wet paint layer is typically at least about 0.5 mils (approximately 0.03 gal./100 ft$^2$). Typically the wet paint layer is less than about 50 mils (approximately 3.13 gal./100 ft$^2$); however, this is not required. In one non-limiting example, the thickness of the wet paint layer from a paint having a reflectivity of at least about 75% to form a roofing material having a resulting reflectivity that exceeds about 65% is about 5-25 mils. The thickness of the dried paint layer generally depends on the amount of solids in the paint. For example, a paint having about 62% solids has a dried layer thickness of about 20 mils from a 32 mils thick wet paint layer. It has been found that a single layer of granules in combination with a layer of highly reflective paint can form a roofing material having a resulting reflectivity of 65% or greater. This highly reflective roofing material can be formed by a manufacturing process at a site that is remote to the site that the roofing materials are to be installed. Two non-limiting examples of manufacturing process that can be used to form this roofing material are illustrated in FIGS. 10 and 11, which will be described in detail below. The roofing material formed by an off-site manufacturing process (e.g., prefabrication process) has a resulting reflectivity when applied to a roof of a building or other type of structure without having to further treat the surface of the roofing material.

The type of paint used on the roofing material is limited only to the ability of the paint to properly bind to the bitumen- or asphalt-based material 202 and/or granules 208. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required.

As shown in FIG. 8, granules 212 are partially embedded and/or secured in the upper surface paint layer 210. As can be appreciated, some of granules 212 may be fully embedded in the paint layer and/or not embedded in the paint layer to meet the desired end use of roofing material 200. Typically, granules 212 are applied to paint layer 210 prior to the paint layer fully drying; however, this is not required. When granules 212 are applied prior to the paint layer becoming fully dried, the non-fully dried paint facilitates in the adhesion of the granules to the surface of the roofing material. Indeed, if granules 212 are applied after the paint has substantially or fully dried, a binder can be used to facilitate in the adhesion of the granules to the top surface of the roofing material. As illustrated in FIG. 8, granules 208 are substantially spherical. In practice, the granules have a variety of different shapes. The shape and size of granules 208 is merely illustrative. Likewise, granules 212 are shown to be spherical. In practice, the granules have a variety of different shapes. The shape and size of granules 212 is also merely illustrated to show that these granules have an average size that is less than the average size of granules 208.

Granules 208, 212 are generally made or and/or are coated with a highly reflective material that reflects most of the sunlight that contacts the granules; however, this is not required. Typically, granules 212 are formed of a highly reflective material. In one non-limiting design of the roofing material, both granules 208 and 212 primarily are and/or are coated with a highly reflective material. In another non-limiting design of the roofing material, granules 208 have an average reflectivity that is less than the average reflectivity of granules 212. In still another non-limiting design of the roofing material, granules 208 have an average reflectivity of less than 45% and granules 212 have an average reflectivity of 45% or greater. In yet another non-limiting design of the roofing material, granules 212 have an average reflectivity of at least 65%. As can be appreciated, the roofing material can include a combination of two or more of these non-limiting designs.

The inclusion of granules 212 on the surface of paint layer 210 provides additional overage for the roofing material. As such, the addition of granules 212 assist in reflecting more sunlight off the roofing material by at least partially covering the black bitumen- or asphalt-based material 202 that still may be exposed after application of granules 208 and paint layer 210. These smaller granules also occupy the spaces between larger granules 208, thereby increasing the amount of coverage by the granules of the upper surface of the roofing material. This increased amount of granule coverage not only can increase the resulting reflectivity of the roofing material, but also forms a more uniform surface of the roofing material, positively affects the physical properties of the roofing material, reduce the rate of degradation of the roofing material, reduce the surface temperature of the roofing material, extend the life of the roofing material, and/or positively affects the aesthetics of the roofing material. The increased coverage provided by granules 212 can results in a 1-5% or more increase in resulting and/or effective reflectivity of the roofing material.

The size of granules 212 is selected to meet the desired end use of roofing material 200. One non-limiting example for shingles, cap sheet roll or modified bitumen roofing and/or siding systems is to use No. 11 grade particles or No. 14 grade particles (particle range of 12-40 US mesh and an average US mesh size of 22 US mesh (i.e., 754 mm sieve designation)) for granules 208, and to use 28×48 designated particles having an average US mesh size of about 50 US mesh (i.e., 304 mm sieve designation) for granules 212. As can be appreciated, other sized particles can be used for granules 208 and/or granules 212. As can also be appreciated, a layer of paint could be applied on the roof material after granules 212 have been applied; however, this is not required.

As described so far above, the roofing material illustrated in FIG. 8 is a shingle, cap sheet roll roofing material or modified bitumen roofing material. It will be appreciated that the broad concept of this aspect of the invention can be applied to other types of roofing systems. If the desired resulting reflectivity is not obtained, another layer of paint can then be applied after the second layer of granules has been applied. This additional layer of paint will typically be a much thinner layer than prior art paint applications that were applied to the top granular surface. As can be appreciated, the concept of the present invention can also be used on wood, plastic or metal roofing systems. The highly reflective paint can be, but is not required to be, applied prior to a first layer of granules is applied to the wood, plastic or metal roofing system. A layer of paint is applied prior to the second layer of smaller granules to obtain a highly reflective roof material. Another layer of paint could be applied after the second layer of granules is applied; however, this is not required. This roofing material could be manufactured off-site (e.g., prefabricated).

Figure 9:
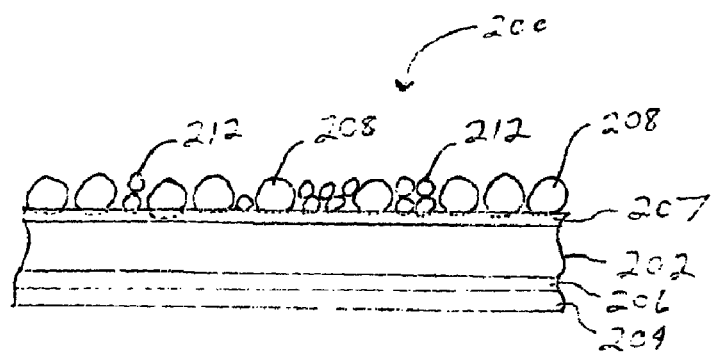
FIG. 9 is a side sectional view of still another roofing and/or siding system illustrating a layer solid material applied onto the layer of paint in accordance with the present invention.

Referring now to FIG. 9, another embodiment of roofing material 200 is illustrated. In this embodiment, the structure of the roofing material is similar to the roofing material illustrated in FIG. 6, but includes a layer of highly reflective paint 207 that has been applied to the top surface of the bitumen- or asphalt-based material 202 prior to the application of granules 208 and 212. The upper surface of the paint layer includes two different sizes of granules 208, 212. A majority of the granules 208 are partially embedded in layer 207; however, this is not required. As stated above, the paint layer 207 can be applied in a single application or by multiple applications. The paint layer can be applied in many different ways such as, but not limited to, spray coating, dipping, pouring and subsequently spreading, etc. If more that a single application is used to apply the paint layer, the process for applying each layer can be the same or different.

The paint that forms paint layer 207 is a highly reflective paint that has a reflectivity of at least about 70% when dry. Typically the paint color is white; however, this is not required. As can be appreciated, a layer of paint can additionally be applied after one or more granules coatings have been applied to the roofing material. Granules 208 are typically applied to paint layer 207 prior to the paint layer fully drying so as to facilitate in the adhesion of the granules to the surface of the roofing material; however, this is not required. Indeed, if the granules are applied after the paint has substantially or fully dried, a binder can be used to facilitate in the adhesion of the granules to the top surface of the roofing material. The paint layer not only increases the resulting reflectivity of the roofing material, the paint layer facilitates in the binding of the granules to the roofing material, increases the strength and/or durability of the roofing material, positively affects the aesthetic properties of the roofing material, and/or positively affects other properties of the roofing material. As can be appreciated, the amount of paint applied to the roofing material can be controlled to obtain a desired surface roughness of the roofing material. The degree of roughness of the roofing material can be in part controlled by the thickness of the paint layer. It has been found that smoother the top surfaces of the roofing material which include a partially exposed highly reflective paint layer have a greater resulting or effective reflectivity than less smooth top surfaces. The thickness of the wet paint layer is typically at least about 0.5 mils (approximately 0.03 gal./100 ft$^2$). Typically the wet paint layer is less than about 50 mils (approximately 3.13 gal./100 ft$^2$); however, this is not required. In one non-limiting example, the thickness of the wet paint layer from a paint having a reflectivity of at least about 75% to form a roofing material having a resulting reflectivity that exceeds about 65% is about 5-25 mils. The thickness of the dried paint layer generally depends on the amount of solids in the paint. For example, a paint having about 62% solids has a dried layer thickness of about 20 mils from a 32 mils thick wet paint layer. It has been found that a single layer of granules that is at least partially embedded within a layer of highly reflective paint can form a roofing material having a resulting reflectivity of 65% or greater. This highly reflective roofing material can be formed by a manufacturing process at a site that is remote to the site that the roofing materials are to be installed. Two non-limiting examples of manufacturing process that can be used to form this roofing material are illustrated in FIGS. 10 and 11, which will be described in detail below. The roofing material formed by an off-site manufacturing process (e.g., prefabrication process) has a resulting reflectivity when applied to a roof of a building or other type of structure without having to further treat the surface of the roofing material.

The type of paint used on the roofing material is limited only to the ability of the paint to properly bind to the bitumen- or asphalt-based material 202 and/or granules 208 and/or 212. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required.

As illustrated in FIG. 9, granules 208 are substantially spherical. In practice, the granules have a variety of different shapes. The shape and size of granules 208 is merely illustrative. Likewise, granules 212 are shown to be spherical. In practice, the granules have a variety of different shapes. The shape and size of granules 212 is also merely illustrated to show that these granules have an average size that is less than the average size of granules 208.

Granules 208, 212 are generally made or and/or are coated with a highly reflective material that reflects most of the sunlight that contacts the granules; however, this is not required. Typically, granules 212 are formed of a highly reflective material. In one non-limiting design of the roofing material, both granules 208 and 212 primarily are and/or are coated with a highly reflective material. In another non-limiting design of the roofing material, granules 208 have an average reflectivity that is less than the average reflectivity of granules 212. In still another non-limiting design of the roofing material, granules 208 have an average reflectivity of less than 45% and granules 212 have an average reflectivity of 45% or greater. In yet another non-limiting design of the roofing material, granules 212 have an average reflectivity of at least 65%. As can be appreciated, the roofing material can include a combination of two or more of these non-limiting designs.

The inclusion of granules 212 on the surface of paint layer 207 provides additional overage for the roofing material. As such, the addition of granules 212 can assist in reflecting more sunlight off the roofing material. These smaller granules occupy the spaces between larger granules 208, thereby increasing the amount of coverage by the granules of the upper surface of the roofing material. This increased amount of granule coverage not only can increase the resulting reflectivity of the roofing material, but also forms a more uniform surface of the roofing material, positively affects the physical properties of the roofing material, reduce the rate of degradation of the roofing material, reduce the surface temperature of the roofing material, extend the life of the roofing material, and/or positively affects the aesthetics of the roofing material. The increased coverage provided by granules 212 can results in a 1-5% or more increase in resulting and/or effective reflectivity of the roofing material.

The size of granules 212 is selected to meet the desired end use of roofing material 200. One non-limiting example for shingles, cap sheet roll or modified bitumen roofing and/or siding systems is to use No. 11 grade particles or No. 14 grade particles (particle range of 12-40 US mesh and an average US mesh size of 22 US mesh (i.e., 754 mm sieve designation)) for granules 208, and to use 28×48 designated particles having an average US mesh size of about 50 US mesh (i.e., 304 mm sieve designation) for granules 212. As can be appreciated, other sized particles can be used for granules 208 and/or granules 212. As can also be appreciated, a layer of paint could be applied on the roof material after granules 212 have been applied; however, this is not required.

As described so far above, the roofing material illustrated in FIG. 9 is a shingle, cap sheet roll roofing material or modified bitumen roofing material. It will be appreciated that the broad concept of this aspect of the invention can be applied to other types of roofing systems. If the desired resulting reflectivity is not obtained, a layer of paint can then be applied after the second layer of granules has been applied. This additional layer of paint will typically be a much thinner layer than prior art paint applications that were applied to the top granular surface. As can be appreciated, the concept of the present invention can also be used on wood, plastic or metal roofing systems. This roofing material could be manufactured off-site (e.g., prefabricated).

Referring now to FIG. 10, there is illustrated an apparatus for forming a roofing material such as, but not limited to, shingles, cap sheet roll roofing or modified bitumen by use of a multiple granular coating process. Reinforcement material 224 is passed through a coater 230 containing liquid asphalt-bituminous composition 232 to at least partially impregnate the reinforcement material. The speed at which the reinforcement material is moved is about 1-100 ft./min., and typically about 20-60 ft./min; however, other speeds can be used. As the reinforcement material 224 is passed through a coater 230, the reinforcement material is guided by one or more guide rollers 234, and a continuous hot asphalt-bituminous coated strip 236 is formed. As can be appreciated, other processes can be used to coat the reinforcement material with the asphalt-bituminous composition. As can also be appreciated, more than one coating of asphalt-bituminous composition can be applied to the reinforcement material. The coated strip is then passed beneath a hopper 240 which applies granules 226 (primary granules) on the upper surface of the coated strip. These granules are typically highly reflective granules; however, this is not required. A gate 242 controls the amount of granules 226 that is deposited on the upper surface of the bituminous coated strip. As can be appreciated, many different types of devices can be used to control the spread pattern and/or amount of granules 226 being applied to the coated strip. The amount of granules 226 deposited on the upper surface of the coated strip is typically selected to cover most of the upper surface of the coated strip; however, this is not required. The coverage of granules 226 on the upper surface of the coated strip is generally represented by the coverage of granules 208 in FIG. 6. For instance, when No. 11 grade granules are used, the coverage provided by the granules is typically about 90-98% (ASTM D6225).

After granules 226 have been deposited on the upper surface of the asphalt-bituminous coated strip, one or more layers of a highly reflective paint 248 is applied by one or more sprayers 246 on the top surface of the coated strip. A paint feeding pipe 244 feeds to the highly reflective paint to the one or more sprayers. As can be appreciated, the highly reflective paint can be applied to the coated strip by other processes. The highly reflective paint typically has a reflectivity when dried of at least about 75%. The highly reflective paint is a fast drying paint that typically takes less than 60 minutes to dry to touch; however, this is not required. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however this is not required. The rate at which the highly reflective paint dries is partially dependent on the surface temperature of the coated strip and the type of paint used. Typically the surface temperature of the coated paint is more than 100° F. When a fast drying paint is used, the paint can dry to touch in less than 45 minutes. A heating or drying mechanism (e.g., air blower, oven, heating coils, etc.), not shown, can be used to obtain faster dry times. The thickness of the one or more wet paint layers is generally about 0.5-25 mils (0.3-16 mils dry), and typically about 3-20 mils (1.5-13 mils dry).

After the highly reflective paint is applied to the coated strip, granules 228 (secondary granules) are then deposited on the surface of the paint layer. Typically, granules 228 are applied to the paint layer prior to the paint layer being fully dried so as to facilitate in the adhesion of the granules to the roofing material. Granules 228 are applied to the paint layer as the coated strip passes under hopper 250. These granules are typically highly reflective granules. Granules 228 have a smaller average particle size than the particle size of granules 226. The amount of granules 228 deposited on the paint layer from hopper 250 is controlled by gate 252. As can be appreciated, many different types of devices can be used to control the spread pattern and/or amount of granules 228 being applied to the bituminous coated strip.

The amount of granules 228 deposited on the paint layer is typically selected to substantially fully fill in the gaps remaining between granules 226; however, other amounts of granules 228 can be used. Typically, the amount of granules 228 deposited on the paint layer is less than the amount of granules 226 deposited on the upper surface of the coated strip; however, this is not required. The smaller sized granules 228 are deposited on paint layer between the spaces left by the previously deposited granules 226. After the smaller sized granules 228 are deposited, the top surface of the roofing material is more uniform as illustrated in FIG. 8. It has been found that the application of the layer of granules 228 increases the resulting or effective reflectively of the roofing material. As can be appreciated, more than two layers of granules can be applied to the roofing material. The size ratio of granules 226 to granules 228 is generally at least about 1.5:1.

After the granules 226 and 228 are deposited on the roofing material, the coated strip is typically passed around a drum 260; however, this is not required. As the coated strip travels about drum 260, many of granules 228 are at least partially pressed into the paint layer. Typically a majority of granules 228 are at least partially pressed into the paint layer. In addition, as the coated strip travels about drum 260, loosely adhered granules 228 fall from the surface of the coated strip. These granules can be disposed of and/or recycled for later use. The drum can be a heated drum to facilitate in the dry of the paint layer; however, this is not required. After the coated strip passes around drum 260, the coated strip can be guided by one or more guide rollers 262 to a cooling section and/or pressing section, not shown. The cooling process is not required. One or more press rollers 264 can be used to at least partially press granules 228 into the paint layer for improved adhesion of granules 228 to the roofing material; however, this is not required. After the coated strip is cooled and/or pressed, the coated strip can be rolled up and/or formed into shingles. The process steps of cooling, pressing, rolling, and shingle formation are well known in the art, thus will not be described herein.

Referring now to FIG. 11, another apparatus is illustrated for forming a roofing material such as, but not limited to, shingles, cap sheet roll roofing or modified bitumen. Reinforcement material 224 is passed through a coater 270 containing a liquid asphalt-bituminous composition 272 to at least partially impregnate the reinforcement material. The speed at which the reinforcement material is moved is about 1-100 ft./min., and typically about 20-60 ft./min; however, other speeds can be used. As the reinforcement material 224 is passed through a coater 270, the reinforcement material is guided by one or more guide rollers 274 and a continuous hot asphalt-bituminous coated strip 276 is formed. As can be appreciated, other processes can be used to coat the reinforcement material with the asphalt-bituminous composition. As can also be appreciated, more than one coating of asphalt-bituminous composition can be applied to the reinforcement material.

After the one or more coatings of asphalt-bituminous composition are applied to the reinforcement material, one or more layers of a highly reflective paint 279 is applied by one or more sprayers 278 on the top surface of the coated strip. This application of a layer of paint on the top of the asphalt-bituminous composition is an optional process. As can be appreciated, the highly reflective paint can be applied to the coated strip by other processes. The paint can be atomized during the spraying process obtain a more uniform coating; however, this is not required. Such application of the paint layer is illustrated in FIG. 9. The highly reflective paint typically has a reflectivity when dried of at least about 75%. The highly reflective paint is a fast drying paint that typically takes less than 60 minutes to dry to touch; however, this is not required. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required. The rate at which the highly reflective paint dries is partially dependent on the surface temperature of the coated strip and the type of paint used. Typically the surface temperature of the coated paint is more than 100° F. When a fast drying paint is used, the paint can dry to touch in less than 45 minutes. The thickness of the one or more wet paint layers is generally about 0.5-25 mils (0.3-16 mils dry), and typically about 3-20 mils (1.5-13 mils dry).

After the one or more coatings of asphalt-bituminous composition are applied to the reinforcement material or after the paint layer has been applied to the top surface of the asphalt-bituminous composition, the coated strip is then passed beneath a hopper 280 which applies granules 226 (primary granules) on the upper surface of the coated strip. These granules are typically highly reflective granules; however, this is not required. A gate 282 controls the amount of granules 226 that is deposited on the upper surface of the coated strip. As can be appreciated, many different types of devices can be used to control the spread pattern and/or amount of granules 226 being applied to the bituminous coated strip. The amount of granules 226 on the upper surface of the coated strip is typically selected to cover most of the upper surface of the coated strip; however, other amounts of granules 226 can be used. The amount of granules 226 deposited on the upper surface of the coated strip is typically selected to cover most of the upper surface of the coated strip; however, this is not required. FIG. 6 is representative of the amount of coverage provided by granules 226. The coverage of granules 226 on the upper surface of the coated strip is generally about 90-98% when No. 11 grade granules are used.

After granules 226 have been deposited on the upper surface of the coated strip, the coated strip is passed about a drum 290; however, this is not required. As the coated strip travels about drum 290, many of granules 226 are at least partially pressed into the coated strip. Typically a majority of granules 226 are at least partially pressed into the asphalt-bituminous layer on the coated strip or the paint layer on the coated strip; however, this is not required. As the coated strip travels about drum 290, loosely adhered granules 226 fall from the surface of the coated strip. These granules can be disposed of and/or recycled for later use. The fallen granules expose regions in the asphalt-bituminous layer or paint layer that are not covered by granules 226. As illustrated in FIG. 11, there is a hopper 292 positioned adjacently to drum 290. Hopper 292 is used to collect the loose granules for disposal and/or for later use. As can be appreciated, the use of hopper 292 is optional. Drum 290 can be a cooling drum to cool the one or more coatings on the coated strip; however, this is not required.

After the coated strip passes around drum 290, the coated strip is fed to drum 294; however, this is not required. The path of the coated strip between drums 290 and 292 is illustrated as an "S" shape; however, other shaped paths for the coated strip can be used. As the coated strip passes about drum 294, the coated strip passes under press roller 296; however, this is not required. Press roller 296 is used to at least partially press granules 226 into the asphalt-bituminous layer or paint layer on the coated strip to improve adhesion of the granules to the roofing material. Use of press roller 296 results in granules 226 twice being at least partially pressed into the asphalt-bituminous layer or paint layer (i.e., first by drum 290 and second by press roller 296 and drum 294). As can be appreciated, the use of press roller 296 is optional. When a paint layer has been applied to the coated strip prior to the application of granules 226, press roller is not used; however, the press roller can be used if desired. Typically after the coated strip passes under press roller 296, a majority of granules 226 are partially embedded in the asphalt-bituminous layer or paint layer.

After granules 226 have been deposited on the upper surface of the coated strip, one or more layers of a highly reflective paint 312 can be applied by one or more sprayers 310 on the top surface of the coated strip. The paint can be atomized during the spraying process obtain a more uniform coating; however, this is not required. As can be appreciated, the highly reflective paint can be applied to the coated strip by other processes. The highly reflective paint typically has a reflectivity when dried of at least about 75%. The highly reflective paint is a fast drying paint that typically takes less than 60 minutes to dry to touch; however, this is not required. The color of the highly reflective paint is typically white; however, this is not required. The rate at which the highly reflective paint dries is partially dependent on the surface temperature of the coated strip and the type of paint used. When a fast drying paint is used, the paint can dry to touch in less than 45 minutes. The thickness of the one or more wet paint layers is generally about 0.5-25 mils (0.3-16 mils dry), and typically about 3-20 mils (1.5-13 mils dry). If a paint layer is applied prior to the application of granules 226, further application of paint layers to the coated strip can be eliminated. However, it can be appreciated that another paint layer can be applied after the application of granules 226.

After the paint layer has been applied, granules 228 (secondary granules) are then deposited on the upper surface of the paint layer as the coated strip passes under hopper 284. These granules are typically highly reflective granules. The amount of granules 228 deposited on the upper surface of the paint layer from hopper 284 is controlled by gate 286. As can be appreciated, many different types of devices can be used to control the spread pattern and/or amount of granules 228 being applied to the paint layer. The amount of granules 228 deposited on the paint layer is typically selected to substantially fully fill in the gaps remaining between granules 226; however, other amounts of granules 228 can be used. Typically, the amount of granules 228 deposited on the paint layer is less than the amount of granules 226 deposited on the upper surface of the coated strip; however, this is not required. The smaller sized granules 228 are deposited on paint layer between the spaces left by the previously deposited granules 226. After the smaller sized granules 228 are deposited, the top surface of the roofing material is more uniform as illustrated in FIG. 8. It has been found that the application of the layer of granules 228 increases the resulting or effective reflectively of the roofing material. As can be appreciated, more than two layers of granules can be applied to the roofing material. The size ratio of granules 226 to granules 228 is generally at least about 1.5:1. As can be appreciated, additional coatings of granules can be applied to the roofing material; however, this is not required.

After the coated strip passes under hopper 284, the coated strip can travel under a heating or drying mechanism (e.g., air blower, oven, heating coils, etc.), not shown, can be used to obtain faster paint drying times; however, this is not required. As can be appreciated, one or more drying mechanism can be used to at least partially dry the paint after application of one or more paint layers and prior to an application of a layer of granules and/or at least partially dry the paint layer after a layer of granules has been applied to the top of the paint layer.

Referring again to FIG. 11, after the coated strip has granules 228 deposed on the paint layer, the coated strip can pass under another paint application mechanism 316 to apply one or more additional layers of paint via sprayers 316 on the surface of the coated strip; however, this paint application step is not required. The paint can be atomized during the spraying process obtain a more uniform coating; however, this is not required. As can be appreciated, the highly reflective paint can be applied to the coated strip by other processes. The highly reflective paint typically has a reflectivity when dried of at least about 75%. The highly reflective paint is a fast drying paint that typically takes less than 60 minutes to dry to touch; however, this is not required. The paint can be a water based paint, latex based paint, acrylic-based paint, a latex-acrylic-based paint, a urethane-based paint, a solvent-based paint (e.g., petroleum-based solvent, alcohol-based solvent, etc.), Polyvinylidene Fluoride (PVDF) based paint, and the like. Non-limiting examples of a few types of paints that can be used include, but are not limited to, fast drying latex paint, waterborne dryfall paint, acrylic paint, and methanol solvent-based paint. Non-limiting examples of paint that can be used in the present invention include, but are not limited to, a) a PVDF-based white acrylic paint, b) an aliphatic and/or aromatic white polyurethane coating, and/or c) a white acrylic-based paint. As can be appreciated, other or additional types of paints can be used. Typically the color of these paints is white or extra white; however, this is not required. The rate at which the highly reflective paint dries is partially dependent on the surface temperature of the coated strip and the type of paint used. Typically the surface temperature of the coated paint is more than 100° F. When a fast drying paint is used, the paint can dry to touch in less than 45 minutes. The thickness of the one or more wet paint layers is generally about 05-25 mils (0.3-16 mils dry), and typically about 1-15 mils (1.5-13 mils dry). After the one or more paint layers have been applied, the coated strip can travel under a heating or drying mechanism (e.g., air blower, oven, heating coils, etc.), not shown, can be used to obtain faster drying times; however, this is not required.

After granules 228 have been applied to the coated strip, the coated strip moves to drum 298. Positioned adjacently to drum 298 is a press roller 300. Press roller 300 is used to at least partially press and at least partially embed newly applied granules 228 in the paint layer. Typically after the coated strip passes press roller 300, a majority of granules 228 are partially embedded in the paint layer. As can be appreciated, the use of press roller 300 is optional. Press roller is typically not used when a layer of paint has been applied on the top surface of granules 228; however, the press roller can be used. As the coated strip passes about drum 298, loosely adhered granules 228 fall from the surface of the strip. As can be appreciated, the use of drum 298 is optional. The fallen granules can be disposed of and/or recycled for later use. As illustrated in FIG. 11, there is a hopper 302 positioned adjacently to drum 298. Hopper 302 is used to collect the loose granules for disposal and/or for later use. As can be appreciated, the use of hopper 302 is optional. Drum 298 can be a heated drum to facilitate in the drying of the one or more paint layers on the coated strip; however, this is not required.

Once the coated strip passes about drum 298, the coated strip is typically guided by one or more guide rollers to a cooling section and/or pressing section; however, these are not required. As illustrated in FIG. 11, the coated strip passes about drums 304, 305, 306. As the coated strip passes about these drums, granules 228 are further at least partially pressed and partially embedded in the paint layer, and/or loose granules fall from the coated strip. As can be appreciated, the use of drums 304, 305 and/or 306 is optional. Drum 304, 305 and/or 306 can be heated drums to facilitate in the drying of the one or more paint layers on the coated strip; however, this is not required. Drum 304, 305 and/or 306 can be cooling drums to facilitate in the cooling of the coating strip; however, this is not required. Another press roller 306 is illustrated as positioned adjacently to drum 306. The press roller is used to partially press and at least partially embed granules 228 in the paint layer. As can be appreciated, press roller 308 is optional.

After the coated strip is cooled and/or pressed, the asphalt bituminous coated strip is rolled up and/or formed into shingles. The process steps of cooling, pressing, rolling, and shingle formation are well known in the art, thus will not be described herein.

The process described above can be used to form a roofing material have high reflectivity. Several different roofing materials can be prefabricated by the processes illustrated in FIGS. 10 and 11. For instance, 1) a roofing material that includes a layer of asphalt-bituminous coated on a reinforcement material, one or more paint layers applied to the top surface of the asphalt-bituminous coating, and one or more layers of granules applied to the top surface of the paint layer, 2) a roofing material that includes a layer of asphalt-bituminous coated on a reinforcement material, one or more paint layers applied to the top surface of the asphalt-bituminous coating, and one or more layers of granules applied to the top surface of the paint layer wherein in two distinct sizes of granules are applied (FIG. 9), 3) a roofing material that includes a layer of asphalt-bituminous coated on a reinforcement material, one or more paint layers applied to the top surface of the asphalt-bituminous coating, one or more layers of granules applied to the top surface of the paint layer, and one or more paint layers are applied to the top surface of the granules, 4) a roofing material that includes a layer of asphalt-bituminous coated on a reinforcement material, one or more paint layers applied to the top surface of the asphalt-bituminous coating, one or more layers of granules applied to the top surface of the paint layer wherein in two distinct sizes of granules are applied, and one or more paint layers are applied to the top surface of the granules, 5) a roofing material that includes a layer of asphalt-bituminous coated on a reinforcement material, one or more paint layers applied to the top surface of the asphalt-bituminous coating, one or more layers of granules applied to the top surface of the paint layer, one or more paint layers are applied to the top surface of the granules, one or more layers of additional granules applied to the top surface of the paint layer, and one or more layers of paint are applied to the additional granule layer, 6) a roofing material that includes a layer of asphalt-bituminous coated on a reinforcement material, one or more layers of granules applied to the top surface of the asphalt-bituminous coating, and one or more paint layers are applied to the top surface of the granules (FIG. 7), 7) a roofing material that includes a layer of asphalt-bituminous coated on a reinforcement material, one or more layers of granules applied to the top surface of the asphalt-bituminous coating wherein in two distinct sizes of granules are applied, and one or more paint layers are applied to the top surface of the granules, 8) a roofing material that includes a layer of asphalt-bituminous coated on a reinforcement material, one or more layers of granules applied to the top surface of the asphalt-bituminous coating, one or more paint layers are applied to the top surface of the granules, and one or more layers of additional granules applied to the top surface of the paint layer (FIG. 8), and 9) a roofing material that includes a layer of asphalt-bituminous coated on a reinforcement material, one or more layers of granules applied to the top surface of the asphalt-bituminous coating, one or more paint layers are applied to the top surface of the granules, one or more layers of additional granules applied to the top surface of the paint layer, and one or more layers of paint are applied to the additional granule layer. As can be appreciated, other types of roofing materials can be formed by the manufacturing process set forth in FIGS. 10 and 11.

The roofing materials that are formed can include wide variety of paint types and/or granule types. For instance, when a highly reflective paint is used and when highly reflective granules having a size designation of 12×40 having an average particle size of about 19 US mesh (i.e., 958 mm sieve designation) are used for granules 226 and highly reflective granules having a size designation of 40×70 having an average particle size of about 47 US mesh (i.e., 330 mm sieve designation) are used for granules 228, the resulting reflectivity of more than 60%, and typically at least 65%.

Several non-limiting examples are set forth below that illustrate the roofing materials in accordance with the present invention.

| Paint Type | 16 mils wft Smooth Coating | 5 mils wft Top of Granules | 10 mils wft Top of Granules | 15 mils wft Top of Granules | 32 mils wft Top of Granules | 5 mils wft Between Granules | 10 mils wft Between Granules |
|---|---|---|---|---|---|---|---|
| Traffic Paint A | 82 | 63 | 64 | 67 | 77 | 69-74.9 | — |
| Traffic Paint B | 86 | 65-66 | — | — | — | 70-72 | 70.4-77.5 |
| DryFall Pain A | 81 | 62 | 63 | 65 | 70 | — | — |

As illustrated above, two different fast drying white traffic paints were used, and one fast drying white dryfall paint was used. All three of these paints were initially applied to a flat surface at a thickness of about 16 mils wet paint to determine the reflectivity of the paint. Each of the paints had a reflectivity of more than 80%, which is illustrated in the second column. The third column illustrates the resulting or effective reflectivity of a roofing material that has two coating coatings granules which are top coated with about 5 mils of wet paint (e.g., about 0.313 gal./100 ft$^2$ of paint). Non-limiting examples of the two coating processes are illustrated in FIGS. 10 and 11. The resulting or effective reflectivity of the roofing materials ranged from about 62-66%. The fourth column illustrates the resulting or effective reflectivity of a roofing material that has two coating coatings granules which are top coated with about 10 mils of wet paint (e.g., about 0.625 gal./100 ft$^2$ of paint). Non-limiting examples of the two coating processes are illustrated in FIGS. 10 and 11. The resulting or effective reflectivity of the roofing materials for two of the paints tested ranged from about 63-64%. The fifth column illustrates the resulting or effective reflectivity of a roofing material that has two coating coatings granules which are top coated with about 15 mils of wet paint (e.g., about 0.938 gal./100 ft$^2$ of paint). Non-limiting examples of the two coating processes are illustrated in FIGS. 10 and 11. The resulting or effective reflectivity of the roofing materials for two of the paints tested ranged from about 65-67%. The sixth column illustrates the resulting or effective reflectivity of a roofing material that has two coatings of coating granules wherein a paint layer has been applied prior to the second layer of granules being applied to the roofing material. The thickness of the paint layer is about 5 mils of wet paint (e.g., about 0.313 gal./100 ft² of paint). Non-limiting examples of the two coating processes are illustrated in FIGS. 10 and 11. The resulting or effective reflectivity of the roofing materials for two of the paints tested ranged from about 69-74.9%. The seventh column illustrates the resulting or effective reflectivity of a roofing material that has two coatings of coating granules wherein a paint layer has been applied prior to the second layer of granules being applied to the roofing material. The thickness of the paint layer is about 10 mils of wet paint (e.g., about 0.625 gal./100 ft² of paint). Non-limiting examples of the two coating processes are illustrated in FIGS. 10 and 11. The resulting or effective reflectivity of the roofing materials for two of the paints tested ranged from about 70.4-77.5%.

The invention has been described with reference to the preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

We claim:

1. A method of forming a roofing material, siding material, and combinations thereof comprising:
   a) selecting a plurality of granules;
   b) providing an adhering surface that is designed to be subsequently used as at least part of a roofing system of a structure;
   c) applying said granules on said adhering surface until at least 90% of said adhering surface is covered by said granules, at least a portion of said granules are highly reflective granules that have an average reflectivity of at least 55%, at least a portion of said granules are non-coated granules having a generally white color; and,
   d) applying a layer of paint to said adhering surface, said granules, and combinations thereof to form said roofing material, said siding material, and combinations thereof, said paint including a highly reflective paint, said highly reflective paint has a generally white color, said highly reflective paint including water based paint, latex based paint, acrylic-based paint, latex-acrylic-based paint, urethane-based paint, solvent-based paint, polyvinylidene fluoride based paint, and combinations thereof, said roofing material, said siding material, and combinations thereof having an average resulting reflectively of at least 55%.

2. The method as defined in claim 1, including the use of at least two different sized granules, a first size of granules having an average particle size that is greater than an average particle size of a second size of granules, said first size of granules being applied to said adhering surface prior to said second size of said granules.

3. The method as defined in claim 1, wherein said roofing material, siding material, and combinations thereof is a prefabricated material, said adhering surface being continuously moved as said granules are applied to said adhering surface.

4. The method as defined in claim 1, wherein at least one layer of paint is applied to a top layer of said granules.

5. The method as defined in claim 1, wherein at least one layer of said paint is applied between two layers of granules.

6. The method as defined in claim 1, wherein at least one layer of paint is applied between said adhering surface and a layer of said granules.

7. The method as defined in claim 1, wherein a resulting reflectivity of said roofing or siding system is at least 60%.

8. The method as defined in claim 1, wherein said adhering surface includes an asphalt surface, bitumen surface, and combinations thereof.

9. The method as defined in claim 1, wherein said adhering surface includes an adhesive surface.

10. The method as defined in claim 1, wherein said a majority of said granules applied to said adhering material are partially embedded in said adhering material.

11. The method as defined in claim 1, wherein said step of applying said granules includes dropping said granules onto said top surface of said adhering material or layer of paint at a height that only causes partial embedding of most of said granules in said top surface of said adhering material or layer of paint.

12. The method as defined in claim 2, wherein said step of applying includes first applying a first sized of said granules to said top surface of said adhering material, subsequently applying a layer of paint on said granules, and then applying a second sized layer of said granules to said layer of paint, said first sized granules having an average particle size that is greater than an average particle size of said second sized granules.

13. The method as defined in claim 1, wherein said paint in a wet state having an average thickness of about 5-25 mils.

14. A method of forming a rooting material, siding material, and combinations thereof comprising:
    a) selecting a plurality of granules;
    b) providing an adhering surface that is designed to be subsequently used as at least part of a roofing system of a structure, said adhering surface includes an adhesive surface, an asphalt surface, bitumen surface, and combinations thereof;
    c) applying said granules on said adhering surface until at least 95% of said adhering surface is covered by said granules, said granules having an average resulting reflectively of at least 35%; and,
    d) applying a layer of paint to said adhering surface, said granules, and combinations thereof to form said roofing material, said siding material, and combinations thereof; said paint in a wet state having an average thickness of about 5-25 mils; said paint including a highly reflective paint; said highly reflective paint including water based paint, latex based paint, acrylic-based paint, latex-acrylic-based paint, urethane-based paint, solvent-based paint, polyvinylidene fluoride based paint, and combinations thereof; said roofing material, said siding material, and combinations thereof having an average resulting reflectively of at least 70%.

15. The method as defined in claim 14, wherein at least one layer of paint is applied to atop layer of said granules, at least one layer of said paint is applied between two layers of granules, at least one layer of paint is applied between said adhering surface and a layer of said granules or combinations thereof.

16. The method as defined in claim 15, wherein said step of applying said granules includes continuously moving said roofing material, siding material, and combinations thereof as said granules are applied to said adhering surface or said layer of paint, and dropping said granules onto said top surface of said adhering material or layer of paint at a height that only causes partial embedding of most of said granules in said top surface of said adhering material or layer of paint.

17. The method as defined in claim 16, including the use of at least two different sized granules, a first size of granules having an average particle size that is greater than an average particle size of a second size of granules, said first size of granules being applied to said adhering surface prior to said second size of said granules.

18. The method as defined in claim 17, wherein said step of applying includes first applying a first sized layer of said granules to said top surface of said adhering material, subsequently applying a layer of paint on said granules, and then applying a second sized layer of said granules to said layer of paint, said first sized granules having an average particle size that is greater than an average particle size of said second sized granules.

19. The method as defined in claim 16, wherein said step of applying includes first applying a first sized layer of said granules to said top surface of said adhering material, and subsequently applying a layer of paint on said granules.

20. The method as defined in claim 17, wherein said step of applying includes first applying a first sized layer of said granules to said top surface of said adhering material, subsequently applying a second sized layer of said granules to said adhering material, and then applying a layer of paint on said first and second sized granules, said first sized granules having an average particle size that is greater than an average particle size of said second sized granules.

21. The method as defined in claim 16, wherein said step of applying includes first applying a first layer of paint on said adhering material, subsequently applying a first sized layer of said granules to said layer paint, and then applying a second layer of paint on said granules.

22. The method as defined in claim 17, wherein said step of applying includes first applying a first layer of paint on said adhering material, subsequently applying a first sized layer of said granules to said first layer of paint, subsequently applying a second sized layer of said granules to said first layer of paint, and then applying a second layer of paint on said first and second sized granules, said first sized granules having an average particle size that is greater than an average particle size of said second sized granules.

23. The method as defined in claim 17, wherein said step of applying includes first applying a first layer of paint on said adhering material, subsequently applying a first sized layer of said granules to said first layer of paint, subsequently applying a second layer of paint on said first sized layer of said granules, subsequently applying a second sized layer of said granules to said second layer of paint, said first sized granules having an average particle size that is greater than an average particle size of said second sized granules.

24. The method as defined in claim 17, wherein said step of applying includes first applying a first layer of paint on said adhering material, subsequently applying a first sized layer of said granules to said first layer of paint, subsequently applying a second layer of paint on said first sized layer of said granules, subsequently applying a second sized layer of said granules to said second layer of paint, and then applying a third layer of paint on said second sized layer of said granules, said first sized granules having an average particle size that is greater than an average particle size of said second sized granules.

* * * * *